US012550057B2

United States Patent
Abotabl et al.

(10) Patent No.: US 12,550,057 B2
(45) Date of Patent: Feb. 10, 2026

(54) TECHNIQUES FOR SAVING ENERGY IN WIRELESS NETWORK COMMUNICATIONS

(71) Applicant: QUALCOMM Incorporated, San Diego, CA (US)

(72) Inventors: Ahmed Attia Abotabl, San Diego, CA (US); Ahmed Elshafie, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 441 days.

(21) Appl. No.: 18/166,979

(22) Filed: Feb. 9, 2023

(65) Prior Publication Data
US 2024/0276368 A1    Aug. 15, 2024

(51) Int. Cl.
*H04W 52/02* (2009.01)
*H04L 5/00* (2006.01)

(52) U.S. Cl.
CPC ... *H04W 52/0212* (2013.01); *H04W 52/0235* (2013.01); *H04L 5/0048* (2013.01)

(58) Field of Classification Search
CPC .......... H04W 52/0212; H04W 52/0235; H04L 5/0048
See application file for complete search history.

(56) References Cited

U.S. PATENT DOCUMENTS

| | | | | |
|---|---|---|---|---|
| 2016/0323818 | A1* | 11/2016 | Senarath | H04W 52/0209 |
| 2019/0261287 | A1* | 8/2019 | Deenoo | H04W 52/34 |
| 2024/0314692 | A1* | 9/2024 | Kang et al. | H04W 52/0235 |
| 2025/0056411 | A1* | 2/2025 | Cheng | H04W 52/0245 |

* cited by examiner

*Primary Examiner* — Steven Hieu D Nguyen
(74) *Attorney, Agent, or Firm* — Dalei Dong; Holland & Hart LLP

(57) ABSTRACT

Methods, systems, and devices for wireless communications are described that provide for multiple operation modes for communication between a network entity and a user equipment (UE). Different operation modes may have different power consumption at the network entity, and different zones within a coverage area of the network entity may have different operation modes, such as based on a quantity of served UEs within each zone. The network entity may provide UEs with a set of operation modes and information for selection of an operation mode for communications with the network entity based on a geographical area or direction relative to the network entity. The network entity and a UE may communicate using a first operation mode based on a location of the UE within a first zone, and may communicate using a second operation mode based on the UE changing location to be within a second zone.

30 Claims, 22 Drawing Sheets

TECHNIQUES FOR SAVING ENERGY IN WIRELESS NETWORK COMMUNICATIONS

FIELD OF TECHNOLOGY

The following relates to wireless communications, including techniques for saving energy in wireless network communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for saving energy in wireless network communications. For example, the described techniques provide for multiple operation modes (e.g., network energy saving (NES) modes) at a network entity, where different operation modes are associated with different energy consumption. In some aspects, different operation modes may be used for different zones within a coverage area of the network entity (e.g., based on a quantity of served UEs within each zone). In some cases, a network entity may provide one or more UEs with a set of operation modes associated with the network entity and information for operation mode selection, such as based on a geographical area or direction relative to the network entity. The network entity and a UE may communicate using a first operation mode based on a location of the UE within a first zone, and may communicate using a second operation mode based on the UE changing location to be within a second zone. In some cases, the second operation mode may be a lower energy consumption operation mode than the first operation mode.

In accordance with some aspects, the network entity may provide signaling that indicates different operation modes and corresponding zones for each operation mode. For example, such signaling may be provided as part of a transmission configuration indicator (TCI) state configuration, may be provided with each synchronization signal block (SSB) (e.g., in a physical broadcast channel (PBCH) payload), may be provided with channel state information (CSI) reference signal resources that are configured with a given operation mode, or any combinations thereof. In some aspects, the UE may use a positioning sensor to determine a current zone and associated operation mode. Additionally, or alternatively, UEs may receive a dynamic indication of an operation mode change per beam or zone, that may indicate operation mode switching of a specific beam. Further, in some aspects different operation modes may be configured for different services or communication priorities.

A method for wireless communication at a user equipment (UE) is described. The method may include receiving a first network energy saving mode indication for a first zone associated with a network entity and a second network energy saving mode indication for a second zone associated with the network entity, the first zone and the second zone each associated with one or more of a geographical area or direction relative to the network entity, communicating with the network entity according to the first network energy saving mode based on the UE being located in the first zone, and communicating, subsequent to communicating according to the first network energy saving mode, with the network entity according to the second network energy saving mode based on the UE being located in the second zone.

An apparatus for wireless communication at a UE is described. The apparatus may include a processor, memory coupled with the processor, and instructions stored in the memory. The instructions may be executable by the processor to cause the apparatus to receive a first network energy saving mode indication for a first zone associated with a network entity and a second network energy saving mode indication for a second zone associated with the network entity, the first zone and the second zone each associated with one or more of a geographical area or direction relative to the network entity, communicate with the network entity according to the first network energy saving mode based on the UE being located in the first zone, and communicating, subsequent to communicating accord to the first network energy saving mode, with the network entity according to the second network energy saving mode based on the UE being located in the second zone.

Another apparatus for wireless communication at a UE is described. The apparatus may include means for receiving a first network energy saving mode indication for a first zone associated with a network entity and a second network energy saving mode indication for a second zone associated with the network entity, the first zone and the second zone each associated with one or more of a geographical area or direction relative to the network entity, means for communicating with the network entity according to the first network energy saving mode based on the UE being located in the first zone, and means for communicating, subsequent to communicating according to the first network energy saving mode, with the network entity according to the second network energy saving mode based on the UE being located in the second zone.

A non-transitory computer-readable medium storing code for wireless communication at a UE is described. The code may include instructions executable by a processor to receive a first network energy saving mode indication for a first zone associated with a network entity and a second network energy saving mode indication for a second zone associated with the network entity, the first zone and the second zone each associated with one or more of a geographical area or direction relative to the network entity, communicate with the network entity according to the first network energy saving mode based on the UE being located in the first zone, and communicating, subsequent to communicating accord to the first network energy saving mode, with the network entity according to the second network energy saving mode based on the UE being located in the second zone.

Some examples of the method, apparatuses, and non-transitory computer-readable medium described herein may further include operations, features, means, or instructions for determining a location of the UE within the first zone or the second zone based on information provided from a positioning system of the UE. In some examples of the method, apparatuses, and non-transitory computer-readable medium described herein, a set of multiple zones are each configured with one network energy saving mode of two or more available network energy saving modes, and where two or more zones located in a same direction from the network entity have a same network energy saving mode. Some examples of the method, apparatuses, and non-transitory computer-readable medium described herein may further include operations, features, means, or instructions for determining the first network energy saving mode for communications with the network entity based on a beam configuration for communications with the network entity and the UE being located in the first zone.

In some examples of the method, apparatuses, and non-transitory computer-readable medium described herein, the receiving may include operations, features, means, or instructions for receiving a transmission configuration indicator (TCI) state configuration that includes the first network energy saving mode indication for a first subset of TCI states associated with the first zone and the second network energy saving mode indication for a second subset of TCI states associated with the second zone.

In some examples of the method, apparatuses, and non-transitory computer-readable medium described herein, the receiving may include operations, features, means, or instructions for receiving a synchronization signal block (SSB) that includes the first network energy saving mode indication for a first beam associated with the first zone and the second network energy saving mode indication for a second beam associated with the second zone. In some examples of the method, apparatuses, and non-transitory computer-readable medium described herein, the receiving may include operations, features, means, or instructions for receiving a channel state information (CSI) reference signal (RS) configuration that includes a first CSI-RS resource associated with the first network energy saving mode and a second CSI-RS resource associated with the second network energy saving mode.

In some examples of the method, apparatuses, and non-transitory computer-readable medium described herein, at least a first communication parameter of a set of communication parameters for communications between the UE and the network entity has a different value in the second network energy saving mode than in the first network energy saving mode. In some examples of the method, apparatuses, and non-transitory computer-readable medium described herein, the set of communication parameters includes one or more of an uplink transmit power, a modulation and coding scheme, a configured grant configuration, a semi-persistent scheduling configuration, or any combinations thereof.

Some examples of the method, apparatuses, and non-transitory computer-readable medium described herein may further include operations, features, means, or instructions for receiving a dynamic indication to switch from the first network energy saving mode to the second network energy saving mode. In some examples of the method, apparatuses, and non-transitory computer-readable medium described herein, the dynamic indication is received in a dedicated downlink control information communication that indicates to switch from the first network energy saving mode to the second network energy saving mode. In some examples of the method, apparatuses, and non-transitory computer-readable medium described herein, the dynamic indication is received in a downlink control information communication that schedules one or more uplink communications from the UE, or that triggers transmission of a channel state information report.

In some examples of the method, apparatuses, and non-transitory computer-readable medium described herein, the first zone and the second zone are each associated with a network energy savings mode that is signaled in one or more of a master information block, a system information block, radio resource control signaling, layer one signaling, layer two signaling, layer three signaling, or any combinations thereof. Some examples of the method, apparatuses, and non-transitory computer-readable medium described herein may further include operations, features, means, or instructions for determining to use the first network energy saving mode based on the UE being located in the first zone and one or more of a service or priority associated with the communications between the UE and the network entity.

A method for wireless communication at a network entity is described. The method may include transmitting, to at least a first UE, a first network energy saving mode indication for a first zone associated with the network entity and a second network energy saving mode indication for a second zone associated with the network entity, the first zone and the second zone each associated with one or more of a geographical area or direction relative to the network entity, communicating with the first UE according to the first network energy saving mode based on the first UE being located in the first zone, and communicating with the first UE according to the second network energy saving mode responsive to a movement of the first UE to the second zone.

An apparatus for wireless communication at a network entity is described. The apparatus may include a processor, memory coupled with the processor, and instructions stored in the memory. The instructions may be executable by the processor to cause the apparatus to transmit, to at least a first UE, a first network energy saving mode indication for a first zone associated with the network entity and a second network energy saving mode indication for a second zone associated with the network entity, the first zone and the second zone each associated with one or more of a geographical area or direction relative to the network entity, communicate with the first UE according to the first network energy saving mode based on the first UE being located in the first zone, and communicate with the first UE according to the second network energy saving mode responsive to a movement of the first UE to the second zone.

Another apparatus for wireless communication at a network entity is described. The apparatus may include means for transmitting, to at least a first UE, a first network energy saving mode indication for a first zone associated with the network entity and a second network energy saving mode indication for a second zone associated with the network entity, the first zone and the second zone each associated with one or more of a geographical area or direction relative to the network entity, means for communicating with the first UE according to the first network energy saving mode based on the first UE being located in the first zone, and means for communicating with the first UE according to the second network energy saving mode responsive to a movement of the first UE to the second zone.

A non-transitory computer-readable medium storing code for wireless communication at a network entity is described. The code may include instructions executable by a processor to transmit, to at least a first UE, a first network energy saving mode indication for a first zone associated with the network entity and a second network energy saving mode indication for a second zone associated with the network entity, the first zone and the second zone each associated with one or more of a geographical area or direction relative to the network entity, communicate with the first UE according to the first network energy saving mode based on the first UE being located in the first zone, and communicate with the first UE according to the second network energy saving mode responsive to a movement of the first UE to the second zone.

In some examples of the method, apparatuses, and non-transitory computer-readable medium described herein, the transmitting may include operations, features, means, or instructions for transmitting configuration information for a set of transmission configuration indicator (TCI) states, the configuration information includes the first network energy saving mode indication for a first subset of TCI states associated with the first zone and the second network energy saving mode indication for a second subset of TCI states associated with the second zone. In some examples of the method, apparatuses, and non-transitory computer-readable medium described herein, the transmitting may include operations, features, means, or instructions for transmitting a synchronization signal block (SSB) that includes the first network energy saving mode indication for a first beam associated with the first zone and the second network energy saving mode indication for a second beam associated with the second zone. In some examples of the method, apparatuses, and non-transitory computer-readable medium described herein, the transmitting may include operations, features, means, or instructions for transmitting a CSI reference signal (RS) configuration that includes a first CSI-RS resource associated with the first network energy saving mode and a second CSI-RS resource associated with the second network energy saving mode.

In some examples of the method, apparatuses, and non-transitory computer-readable medium described herein, at least a first communication parameter of a set of communication parameters for communications between the first UE and the network entity has a different value in the second network energy saving mode than in the first network energy saving mode. In some examples of the method, apparatuses, and non-transitory computer-readable medium described herein, the set of communication parameters includes one or more of an uplink transmit power, a modulation and coding scheme, a configured grant configuration, a semi-persistent scheduling configuration, or any combinations thereof.

Some examples of the method, apparatuses, and non-transitory computer-readable medium described herein may further include operations, features, means, or instructions for transmitting a dynamic indication to the first UE to switch from the first network energy saving mode to the second network energy saving mode. In some examples of the method, apparatuses, and non-transitory computer-readable medium described herein, the dynamic indication is provided in a dedicated downlink control information communication that indicates to switch from the first network energy saving mode to the second network energy saving mode. In some examples of the method, apparatuses, and non-transitory computer-readable medium described herein, the dynamic indication is provided in a downlink control information communication that schedules one or more uplink communications from the UE, or that triggers transmission of a channel state information report.

Some examples of the method, apparatuses, and non-transitory computer-readable medium described herein may further include operations, features, means, or instructions for configuring the first UE to use the first network energy saving mode based on the first UE being located in the first zone and one or more of a service or priority associated with the communications between the first UE and the network entity.

DETAILED DESCRIPTION

Figure 1:
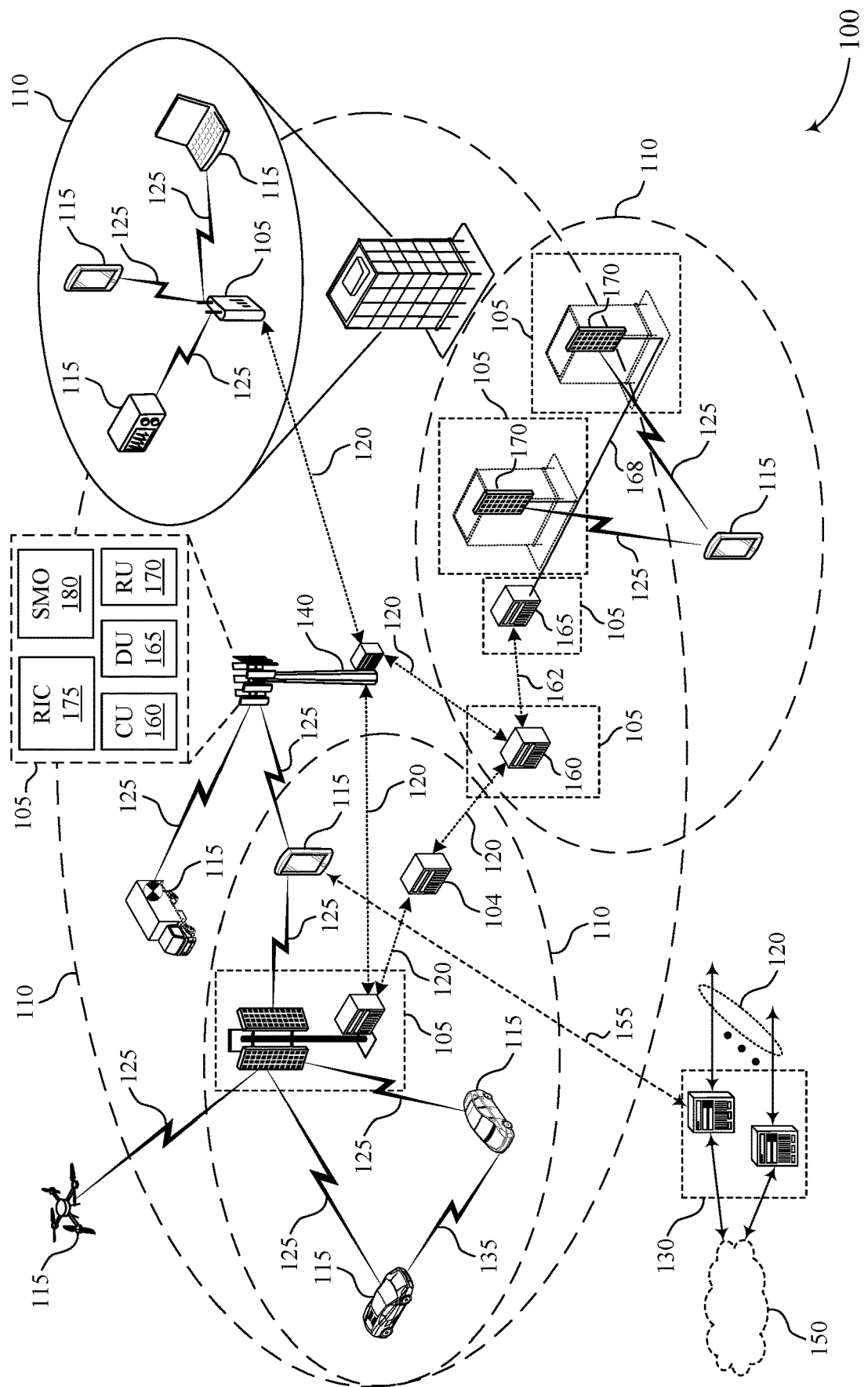
FIG. 1 illustrates an example of a wireless communications system that supports techniques for saving energy in wireless network communications in accordance with one or more aspects of the present disclosure.

A wireless communications system may include a communication device, such as a user equipment (UE) or a network entity (e.g., an eNodeB (eNB), a next-generation NodeB or a giga-NodeB, either of which may be referred to as a gNB, or some other base station), that support wireless communications over one or multiple radio access technologies. Examples of radio access technologies include 4G systems, such as LTE systems, 5G systems (which may be referred to as NR systems), 6G systems, or other radio access technologies. The wireless communications may include uplink transmission, uplink reception, downlink transmission, or downlink reception, sidelink transmission, sidelink reception, or a combination thereof. A communication device may be configured with various circuitry to support wireless communications. In some cases, this various circuitry may include multiple circuit elements, such as multiple transmit/receive chains that each have associated power amplifier, mixer, and filtering components, among others, for example. When transmitting via multiple antenna ports, multiple active transmit chains may consume relatively large amounts of power.

In some cases, network entities may have relatively large energy consumption that may be driven in part by a relatively large number of antennas at a network entity (e.g., gNBs, radio heads, etc.). For example, if a network entity uses all of its antennas, energy consumption can increase by a relatively large amount relative to cases where fewer than all antennas are used for communications. In some cases, network power savings may be achieved by using fewer than all of the antennas at a network-side transmitter (e.g., by using 16 antenna ports instead of 32 antenna ports at a network entity for wireless communications). However, switching from a larger number of antenna ports to a reduced number of antenna ports involves reconfiguring of served UEs with parameters that are based on the different numbers of antenna ports, which can take time and increase overhead. Thus, efficient techniques to configure and indicate a network operation mode may be desirable in order to reduce network power consumption through switching to different operation modes that use different numbers of antennas, while also allowing efficient signaling with low overhead.

In accordance with various aspects discussed herein, transmission parameters for multiple different network operation modes, such as modulation and coding scheme (MCS), transmission power, and a number of active antenna ports, may be configured based on a location or direction relative to a network entity. For example, transmission parameters that support higher throughput may be selected for an area or zone that has a relatively large number of served UEs (e.g., an office building), and transmission parameters that support lower throughput may be selected for an area or zone that has relatively few UEs (e.g., a parking facility located adjacent to the office building). In some cases, the network entity may provide information for selection of a network energy saving (NES) mode for communications based on zone that is associated with a geographical area or direction relative to the network entity. UEs that receive such information may use the configured parameters for communications for the corresponding zone in which a UE is located. For example, a network entity and a UE may communicate using a first operation mode based on a location of the UE within a first zone, and may communicate using a second operation mode based on the UE changing location to be within a second zone. In some cases, the second operation mode may be a lower energy consumption operation mode than the first operation mode.

In accordance with some aspects, the network entity may provide signaling that indicates different operation modes and corresponding zones for each operation mode. For example, such signaling may be provided as part of a transmission configuration indicator (TCI) state configuration, may be provided with each synchronization signal block (SSB) (e.g., in a physical broadcast channel (PBCH) payload), may be provided with channel state information (CSI) reference signal resources that are configured with a given operation mode, or any combinations thereof. In some aspects, the UE may use a positioning module (e.g., a global navigation satellite system (GNSS) module) to determine a current zone, and an associated operation mode may be identified based on the current zone. Additionally, or alternatively, UEs may receive a dynamic indication of an operation mode change per beam or zone, that may indicate operation mode switching of a specific beam. Further, in some aspects different operation modes may be configured for different services or communication priorities.

Techniques as discussed herein may provide for enhanced flexibility in selection of operating modes at a network entity, while signaling changes to operation modes in an efficient manner. In some cases, a network entity may use different operation modes concurrently for different zones. For example, a first zone may be configured for higher throughput operations in order to serve a larger number of UEs (e.g., using 32 antenna ports), and a second zone may be configured for lower throughput operations that can adequately serve a smaller number of UEs (e.g., using 16 antenna ports. Communications parameters associated with the different power operation modes for different zones also may be configured based on expected traffic (e.g., MCS, redundancy version (RV) index, transport block (TB) size, TB scaling factor, etc.). In some cases, Such techniques may allow network entities to reduce operating power, while providing flexible and efficient techniques to indicate operation modes to served devices.

Aspects of the disclosure are initially described in the context of wireless communications systems. Aspects of the disclosure are further illustrated by and described with reference to process flows, apparatus diagrams, system diagrams, and flowcharts that relate to techniques for saving energy in wireless network communications.

FIG. 1 illustrates an example of a wireless communications system 100 that supports techniques for saving energy in wireless network communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for saving energy in wireless network communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some cases, one or more network entities 105 may provide for multiple operation modes (e.g., NES modes), where different operation modes are associated with different energy consumption. In some aspects, different operation modes may be used for different zones within a coverage area 110 of the network entity 105 (e.g., based on a quantity of served UEs 115 within each zone). In some cases, a network entity 105 may provide one or more UEs 115 with a set of operation modes associated with the network entity 105 and information for operation mode selection, such as based on a geographical area or direction relative to the network entity 105. The network entity 105 and a UE 115 may communicate using a first operation mode based on a location of the UE 115 within a first zone, and may communicate using a second operation mode based on the UE 115 changing location to be within a second zone. In some cases, the second operation mode may be a lower energy consumption operation mode than the first operation mode.

Figure 2:
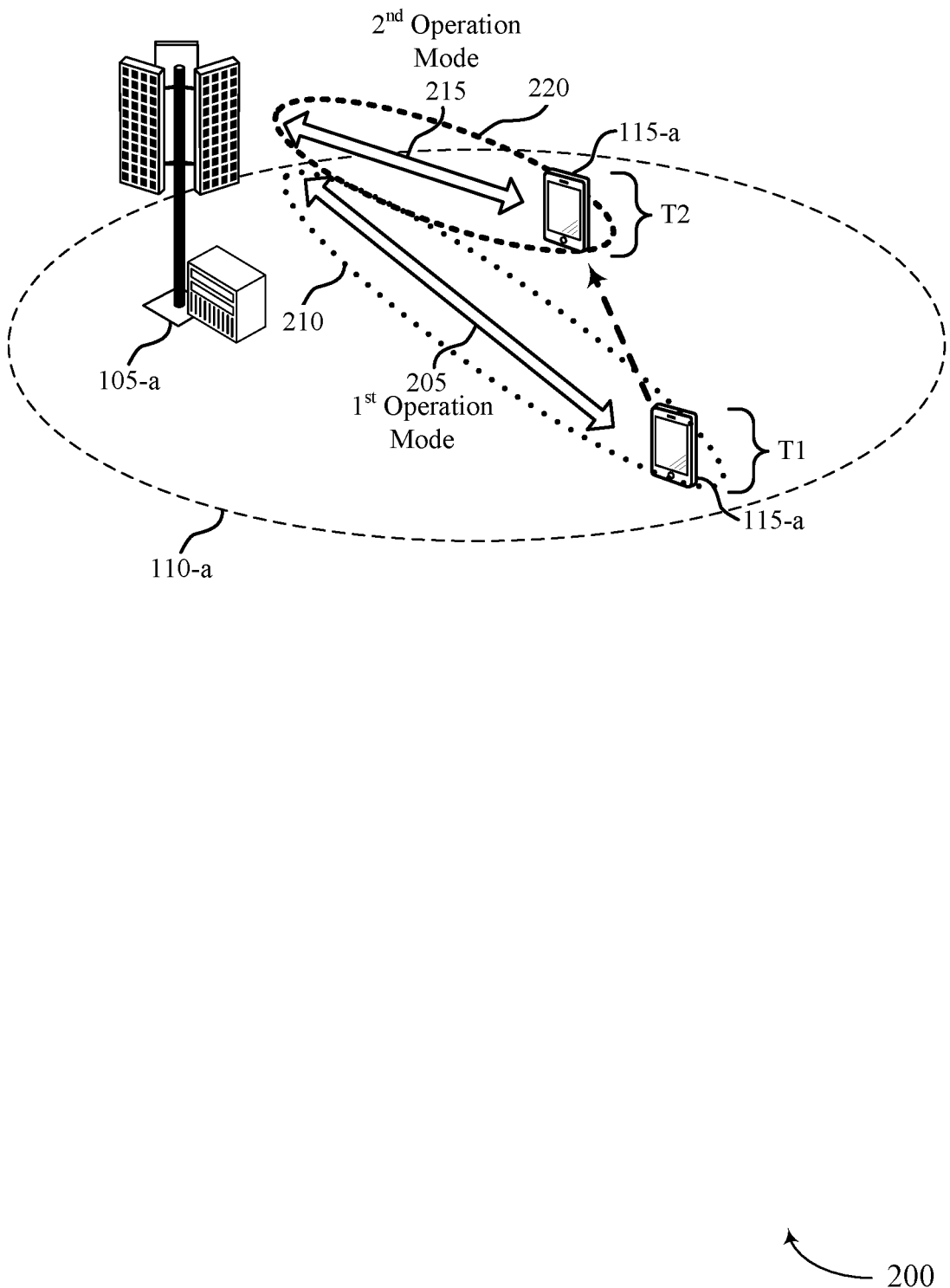
FIG. 2 illustrates an example of a wireless communications system that supports techniques for saving energy in wireless network communications in accordance with one or more aspects of the present disclosure.

FIG. 2 illustrates an example of a wireless communications system 200 that supports techniques for saving energy in wireless network communications in accordance with one or more aspects of the present disclosure. The wireless communications system 200 may implement or be implemented by aspects of the wireless communications system 100 as described in FIG. 1. For example, the wireless communications system 200 may include a network entity 105-a and a UE 115-a, which may be examples of network entities 105 and UEs 115 as described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support power saving, and, in some examples, may promote wireless communications in which operation modes of the network entity 105-a may be selected based at least in part on power consumption considerations, and selected operation modes signaled to the UE 115-a for use in wireless communications based on UE 115-a location.

One or more of the network entity 105-a or the UE 115-a, or any combination thereof, may be equipped with multiple antennas, which may be used to employ techniques as described with reference to FIG. 1. The antennas of one or more of the network entity 105-a or the UE 115-a, or any combination thereof, may be located within one or more antenna arrays or antenna panels, which may support operations as described herein. The network entity 105-a may have an antenna array with a number of rows and columns of antenna ports that the network entity 105-a may use to support wireless communications (e.g., with the UE 115-a). Likewise, the UE 115-a may have one or more antenna arrays that may support various operations as described herein.

In the example of FIG. 2, the UE 115-a and network entity 105-a may communicate via at least a first link 205 using a first operation mode (e.g., a first NES mode). Network entity 105-a and UE 115-a may use the first link 205 to convey control and/or data information according to a first set of communications parameters. In some cases, the first link 205 may include separate downlink and uplink channels (e.g., that may use different time and/or frequency resources). In some cases, the network entity 105-a may transmit operation modes configuration information to the UE 115-a (e.g., via the first link 205). The operation modes configuration information may be transmitted, for example, using RRC signaling that provides multiple different operation modes and associated communications parameters. For example, transmission parameters for multiple different network operation modes may be provided in a table in which index values of different operation modes have associated transmission parameters, such as MCS, RV index, TB size, TB scaling factor, etc. In accordance with various aspects discussed herein, different operation modes may have associated zones within coverage area 110-a of the network entity 105-a, and the UE 115-a may operate according to the operation mode associated with the zone in which the UE 115-a is located.

For example, as illustrated in FIG. 2, at a first time (T1), the UE 115-a may be located in a first zone 210 of the network entity 105-a. In some cases, the UE 115-a may determine that it is located within the first zone 210 based on positioning information that is available to the UE 115-a (e.g., from a GNSS system, a terrestrial-based positioning system, or any combinations thereof). In accordance with the location of the UE 115-a in the first zone 210, the network entity 105-a and UE 115-a may communicate using a first NES mode on the first link 205. In this example, the UE 115-a may move from a location within the first zone 210 to a different location that is within a second zone 220, at a second time (T2). The second zone 220 may be associated with a different NES mode at the network entity 105-*a* and, in accordance with the location of the UE 115-*a* in the second zone 220, the network entity 105-*a* and UE 115-*a* may communicate using the second NES mode on second link 215.

In accordance with some aspects, the network entity 105-*a* may provide signaling that indicates different operation modes and corresponding zones for each operation mode. For example, such signaling may be provided as part of TCI state configuration, may be provided with each SSB (e.g., in a PBCH payload), may be provided with CSI reference signal (CSI-RS) resources that are configured with a given operation mode, or any combinations thereof. In some aspects, the UE 115-*a* may use a positioning sensor to determine a current zone and associated NES mode. Additionally, or alternatively, the UE 115-*a* may receive a dynamic indication of an operation mode change per beam or zone, that may indicate operation mode switching of a specific beam. Further, in some aspects different operation modes may be configured for different services or communication priorities.

Figure 3:
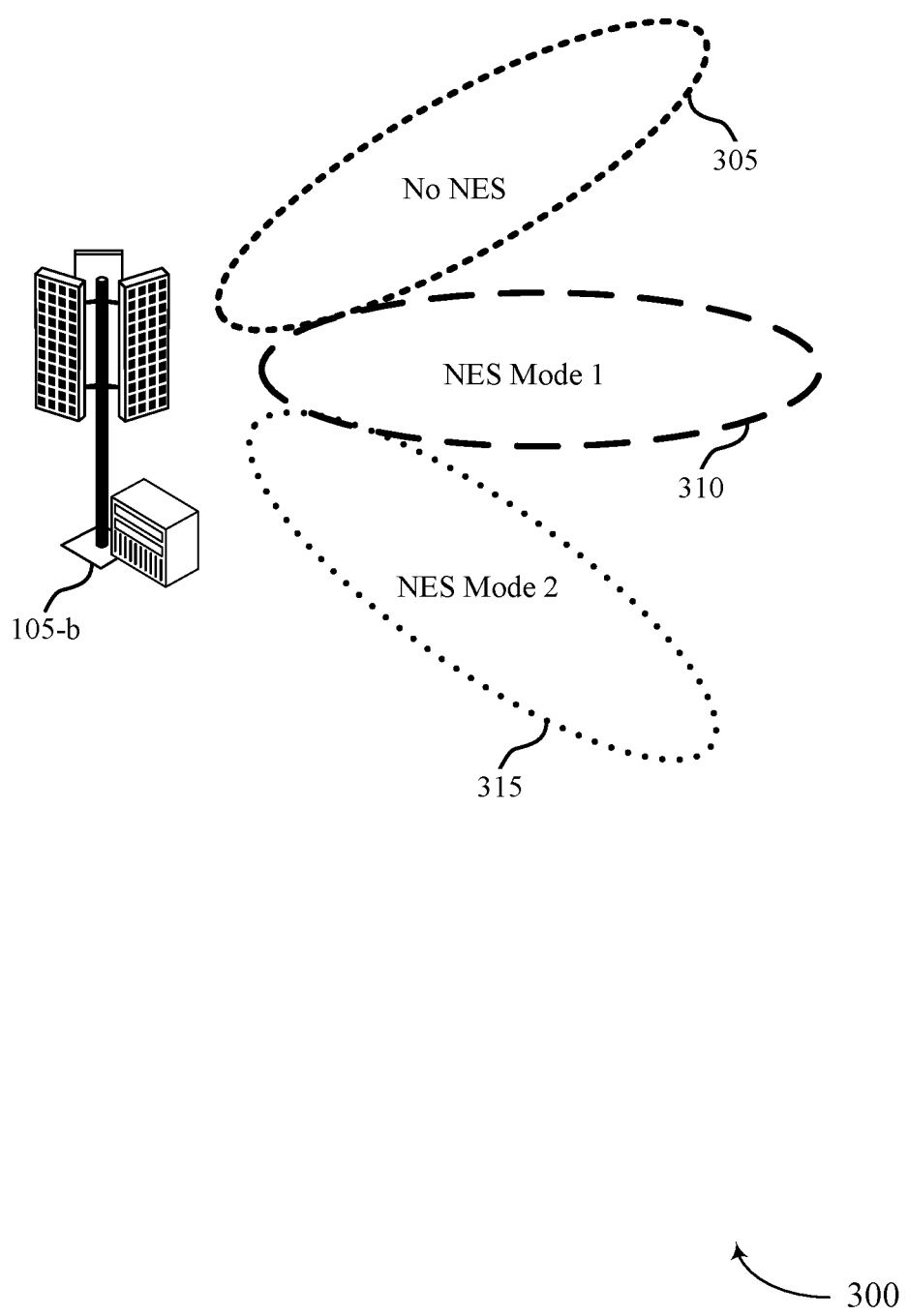
FIG. 3 illustrates an example of a network entity and NES zones that supports techniques for saving energy in wireless network communications in accordance with one or more aspects of the present disclosure.

Such techniques may provide for enhanced network energy efficiency through configuration of a particular direction or zone (e.g., first zone 210) that has a relatively large number of served UEs 115 and/or relatively heavy traffic to use a NES mode that is better suited for the heavier traffic load. Another direction or zone (e.g., second zone 220) that has just a few or no served UEs 115 may use a different NES mode that has reduced power consumption relative to one or more other zones with larger numbers of UEs 115. In some cases, additionally or alternatively, the network entity 105-*a* may transmit a dynamic NES mode change per beam or zone (e.g., via a dedicated DCI, a scheduling DCI, or a DCI triggering a CSI report) that may indicate NES mode switching of a specific beam. Further, different NESs may be configured for different services or communication priorities, which may be signaled with a master information block (MIB), a system information block (SIB), RRC signaling, signaled through L1/L2/L3 signaling, or any combinations thereof. FIG. 3 illustrates an example of different NES modes and different NES zones.

FIG. 3 illustrates an example of a network entity and NES zones 300 that supports techniques for saving energy in wireless network communications in accordance with one or more aspects of the present disclosure. The example of NES zones 300 may represent characteristics of communications in aspects of the wireless communications systems 100 and 200 as described with reference to FIGS. 1 and 2, respectively.

In this example, a network entity 105-*b* may configure multiple zones, including a first zone 305 that does not use NES techniques (e.g., uses legacy operation in which all antenna ports are active for communications, which may be referred to as a first NES mode), a second zone 310 that uses a second NES mode (e.g., that uses fewer than all antenna ports, and a first set of transmission parameters), a third zone 315 that uses a third NES mode (e.g., that uses a same number of antenna ports as the second NES mode, and uses a second set of transmission parameters that provide for further reductions in energy consumption). In some cases, the network entity 105-*b* may determine the different NES modes based on an expected amount of traffic associated with each zone. Different NES modes may have different operation, for example, some NES modes will turn off RF chains while others do not. Further, different NES modes may have different power consumption and different transition times may be used to switch between different combinations of NES modes.

As discussed herein, the network entity 105-*b* may select the different NES modes depending on expected network load. For example, the network entity may identify that a relatively large number of active UEs are present in the first zone 305, and that relatively heavy traffic loads are present. Based on the heavy traffic loads, the network entity 105-*b* may select normal operation (e.g., the first NES mode) in which power saving techniques are not applied to reduce power consumption. Further, the network entity 105-*b* may identify that fewer served UEs are present in the second zone 310, and may apply the second NES mode for the zone. The network entity 105-*b* also may identify that no active UEs are present in the third zone 315, and apply the third NES mode for the zone (e.g., that provides the largest amount of network power reduction). For example, the first zone 305 may correspond to a location of a building in which a high density of UEs may be present, the second zone 310 may correspond to a park or courtyard adjacent to the building in which relatively few UEs are location, and the third zone 315 may correspond to a lake in which UEs are rarely located. In such cases, adopting different network energy saving modes per different directions can give the network flexibility to achieve the trade-off between performance and energy saving. Through providing NES operation per beam or zones, the network entity 105-*b* can divide a coverage area into power modes per zone, where a UE that moves from zone to another can determine the current state of the network.

In accordance with aspects discussed herein, a UE may expect a different network energy saving modes in different directions or zones. In some cases, some zones may be more crowded than others, and some UEs may be moving from one zone to another zone, and such UEs inherit the configuration of the corresponding zone when they move from one zone to other. In some cases, direction may be used to identify NES modes, and two or more zones may have a same configuration if the zones have a same relative direction from the network entity 105-*b*. In some cases, configuration can be jointly based on beam and zone (e.g., closer UEs may use a different NES mode than more distant UEs in a same direction from the network entity 105-*b*). In some cases, the network entity 105-*b* may signal network operation mode, or NES mode configurations, as part of a TCI state configuration, in which a network energy saving mode is configured. In some cases, network operation may be signaled with SSB blocks, that may provide an indication of the network energy saving mode (e.g., through the PBCH payload). In some cases, network operation may be signaled via certain CSI-RS resources that may be configured with a given network energy saving mode. Each network energy saving mode may be configured with a given set of operations at the network side and possible UE behavior at the UE side. In some cases, network energy saving modes may be RRC configured and signaling may provide an index value for each zone that is associated with the RRC configured NES modes.

In some cases, for one or more zones, dynamic network energy saving mode switching might be beneficial (e.g., based on traffic fluctuations within a zone). In some cases, the network entity 105-*b* may transmit, and one or more UEs may receive, a dynamic network energy saving mode change per beam or zone. Such a dynamic indication may be provided via, for example, a dedicated DCI, a scheduling DCI, or a DCI triggering a CSI report that may also indicate network mode switching of a specific beam (e.g., by indicating the TCI state as well the new network energy saving mode).

In some cases, each zone or direction may be associated with semi-static NES modes over time, which may be signaled as part of MIB/SIB1, RRC configured to UEs, or provided via L1/L2/L3 signaling. Additionally, or alternatively, different services that are provided to UEs may be configured with different NES modes. For example, the network entity 105-b may configure different logical channel groups (LCGs) with a particular NES modes. Such configurations may be signaled as part of MIB/SIB1, RRC configured to UEs, or provided via L1/L2/L3 signaling.

Figure 4:
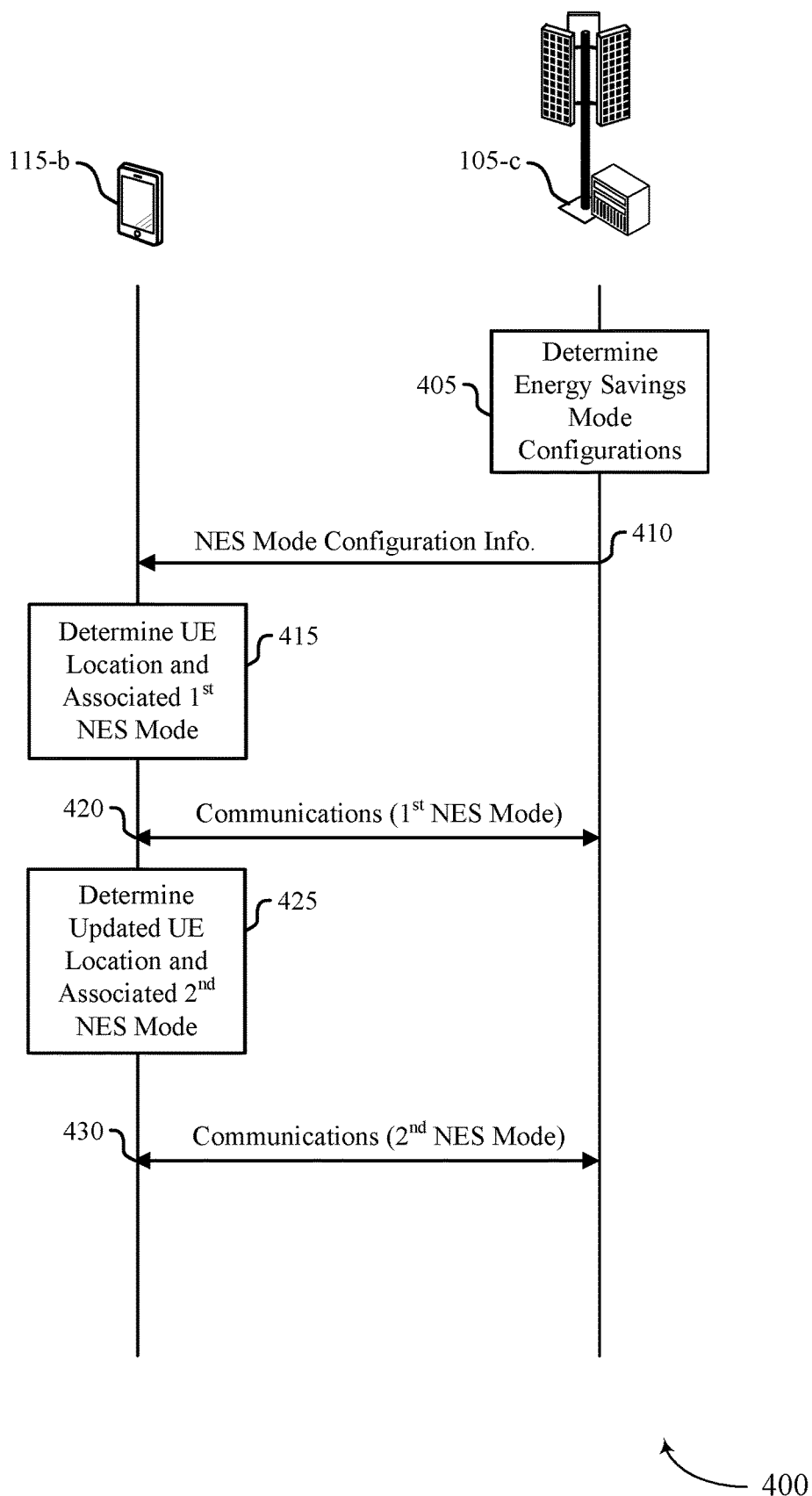
FIG. 4 illustrates an example of a process flow that supports techniques for saving energy in wireless network communications in accordance with one or more aspects of the present disclosure.

FIG. 4 illustrates an example of a process flow 400 that supports techniques for saving energy in wireless network communications in accordance with one or more aspects of the present disclosure. In some examples, the process flow 400 may implement or be implemented by aspects of UEs and network entities as described with reference to FIGS. 1 through 3. For example, the process flow 400 may be implemented by a network entity 105-c and a UE 115-b, which may be examples of a network entity 105 and a UE 115 as described with reference to FIGS. 1 through 3. The process flow 400 may be implemented by the network entity 105-c and the UE 115-b to exchange signaling to promote network entity power saving and reliable communications between one or more of the network entity 105-c and the UE 115-b. In the following description of the process flow 400, the operations between the network entity 105-c and the UE 115-b may be transmitted in a different order than the example order shown, or the operations performed by the network entity 105-c and the UE 115-b may be performed in different orders or at different times. Some operations may also be omitted from the process flow 400, and other operations may be added to the process flow 400.

At 405, the network entity 105-c may determine two or more operation modes for power savings and normal communications. For example, the network entity 105-c may determine a first operation mode for normal or regular communications in which a full set of available antenna ports may be used for communications (e.g., 32 antenna ports), and may determine a second operation mode for power savings communications in which less than the full set of available antenna ports may be used for communications (e.g., 16 antenna ports). In some cases, the network entity 105-c may determine one or more zones (e.g., geographical areas, directions relative to the network entity 105-c, distances from the network entity 105-c, or any combinations thereof) that may have different traffic loads and in which different operation modes may be appropriate (e.g., based on an amount of expected traffic, channel conditions, or any combinations thereof). In some cases, communications parameters may be determined for each operation mode of a set of two or more operation modes, such as a MCS index, transmit power, TB size, RV index, TB scaling factor, etc.

At 410, the network entity 105-c may transmit, and the UE 115-b may receive, NES mode configuration information. The configuration information may include operation mode information for multiple zones, for example. In some cases, zones may be indicated based on geographical information (e.g., a range of latitudes/longitudes), may be indicated based on a beam index (e.g., one or more beam directions based on TCI state may be associated with a particular NES mode), or any combinations thereof.

At 415, the UE 115-b may determine that it is located in a first zone that is associated with a first NES mode. At 420, the UE 115-b and the network entity 105-c may communicate according to the first NES mode. At some later point in time, as indicated at 425, the UE 115-b may determine an updated location and an associated second NES mode. For example, the UE 115-b may determine based on information from a positioning component that it is located in a second zone that has an associated second NES mode. Based on the location of the UE 115-b, at 430, the UE 115-b and the network entity 105-c may communicate according to the second NES mode. In some cases, switching between NES modes may be indicated through a CSI report that is transmitted to the network entity 105-c, which triggers a beam switch to a beam that uses a different NES mode. In some cases, as discussed herein, NES mode selection may be based on location, direction, a type of communication (e.g., type of service and associated priority), or any combinations thereof.

Figure 5:
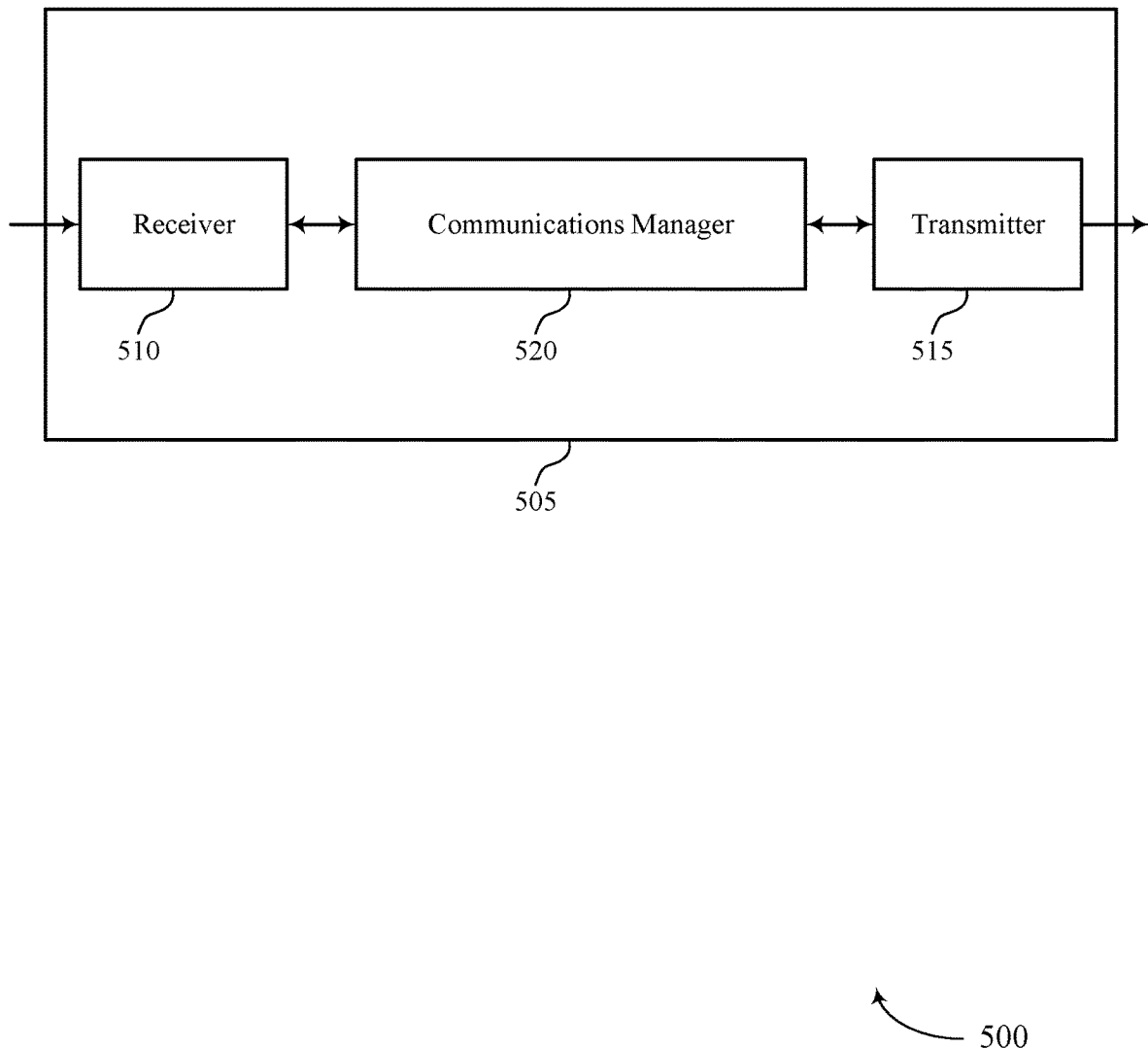
FIGS. 5 and 6 illustrate block diagrams of devices that support techniques for saving energy in wireless network communications in accordance with one or more aspects of the present disclosure.

FIG. 5 illustrates a block diagram 500 of a device 505 that supports techniques for saving energy in wireless network communications in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for saving energy in wireless network communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for saving energy in wireless network communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for saving energy in wireless network communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving a first network energy saving mode indication for a first zone associated with a network entity and a second network energy saving mode indication for a second zone associated with the network entity, the first zone and the second zone each associated with one or more of a geographical area or direction relative to the network entity. The communications manager 520 may be configured as or otherwise support a means for communicating with the network entity according to the first network energy saving mode based on the UE being located in the first zone. The communications manager 520 may be configured as or otherwise support a means for communicating, subsequent to communicating according to the first network energy saving mode, with the network entity according to the second network energy saving mode based on the UE being located in the second zone.

Additionally, or alternatively, the communications manager 520 may support wireless communication at a network entity in accordance with examples as disclosed herein. For example, the communications manager 520 may be configured as or otherwise support a means for transmitting, to at least a first UE, a first network energy saving mode indication for a first zone associated with the network entity and a second network energy saving mode indication for a second zone associated with the network entity, the first zone and the second zone each associated with one or more of a geographical area or direction relative to the network entity. The communications manager 520 may be configured as or otherwise support a means for communicating with the first UE according to the first network energy saving mode based on the first UE being located in the first zone. The communications manager 520 may be configured as or otherwise support a means for communicating with the first UE according to the second network energy saving mode responsive to a movement of the first UE to the second zone.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for network energy savings that allow network entities to reduce operating power, while providing flexible and efficient techniques to indicate operation modes to served devices.

Figure 6:
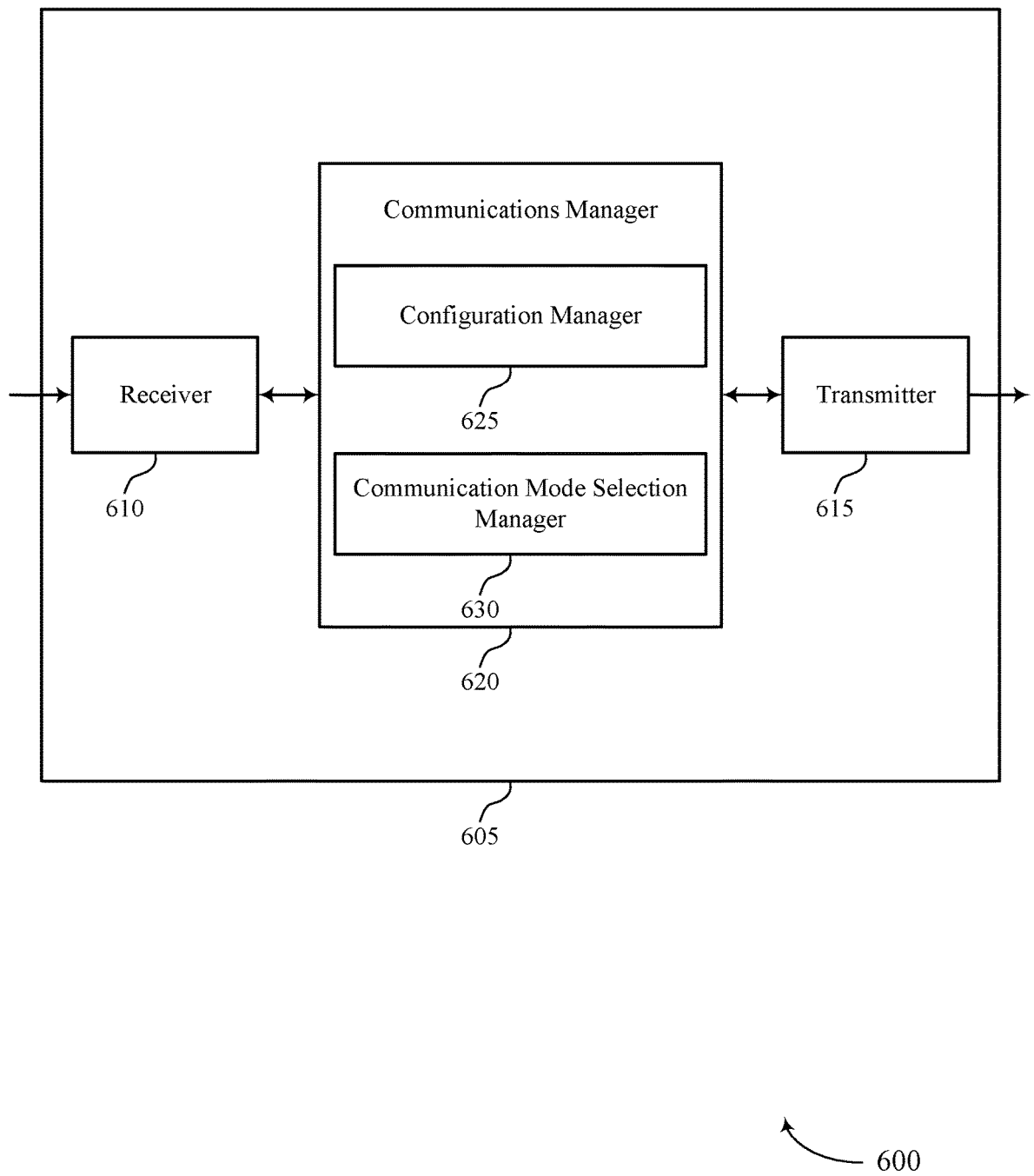

FIG. 6 illustrates a block diagram 600 of a device 605 that supports techniques for saving energy in wireless network communications in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for saving energy in wireless network communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for saving energy in wireless network communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for saving energy in wireless network communications as described herein. For example, the communications manager 620 may include a configuration manager 625 a communication mode selection manager 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The configuration manager 625 may be configured as or otherwise support a means for receiving a first network energy saving mode indication for a first zone associated with a network entity and a second network energy saving mode indication for a second zone associated with the network entity, the first zone and the second zone each associated with one or more of a geographical area or direction relative to the network entity. The communication mode selection manager 630 may be configured as or otherwise support a means for communicating with the network entity according to the first network energy saving mode based on the UE being located in the first zone. The communication mode selection manager 630 may be configured as or otherwise support a means for communicating, subsequent to communicating according to the first network energy saving mode, with the network entity according to the second network energy saving mode based on the UE being located in the second zone.

Additionally, or alternatively, the communications manager 620 may support wireless communication at a network entity in accordance with examples as disclosed herein. The configuration manager 625 may be configured as or otherwise support a means for transmitting, to at least a first UE, a first network energy saving mode indication for a first zone associated with the network entity and a second network energy saving mode indication for a second zone associated with the network entity, the first zone and the second zone each associated with one or more of a geographical area or direction relative to the network entity. The communication mode selection manager 630 may be configured as or otherwise support a means for communicating with the first UE according to the first network energy saving mode based on the first UE being located in the first zone. The communication mode selection manager 630 may be configured as or otherwise support a means for communicating with the first UE according to the second network energy saving mode responsive to a movement of the first UE to the second zone.

Figure 7:
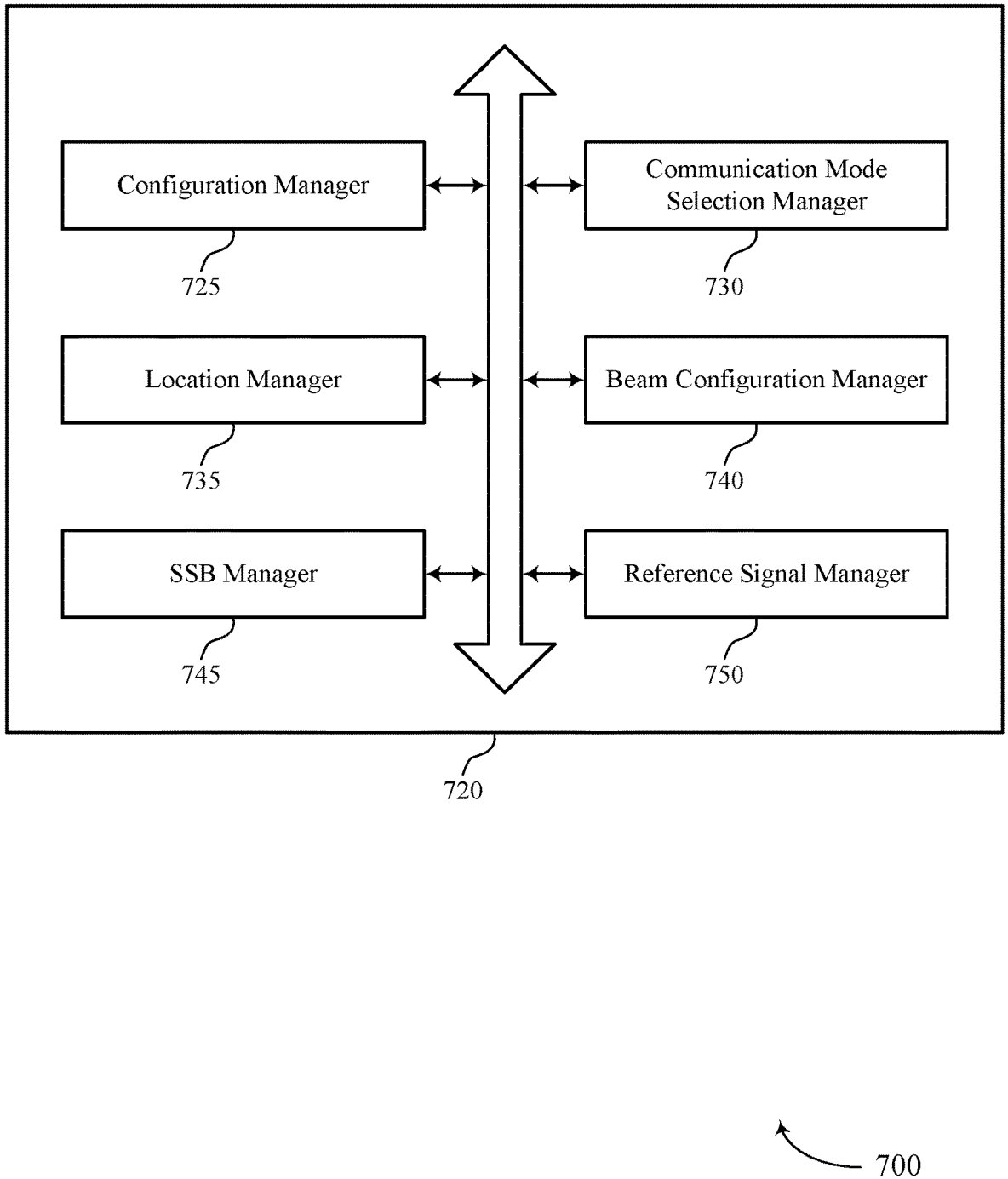
FIG. 7 illustrates a block diagram of a communications manager that supports techniques for saving energy in wireless network communications in accordance with one or more aspects of the present disclosure.

FIG. 7 illustrates a block diagram 700 of a communications manager 720 that supports techniques for saving energy in wireless network communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for saving energy in wireless network communications as described herein. For example, the communications manager 720 may include a configuration manager 725, a communication mode selection manager 730, a location manager 735, a beam configuration manager 740, an SSB manager 745, a reference signal manager 750, or any combination thereof. Each of these components may communicate, directly or indirectly, with one another (e.g., via one or more buses).

The communications manager 720 may support wireless communication at a UE in accordance with examples as disclosed herein. The configuration manager 725 may be configured as or otherwise support a means for receiving a first network energy saving mode indication for a first zone associated with a network entity and a second network energy saving mode indication for a second zone associated with the network entity, the first zone and the second zone each associated with one or more of a geographical area or direction relative to the network entity. The communication mode selection manager 730 may be configured as or otherwise support a means for communicating with the network entity according to the first network energy saving mode based on the UE being located in the first zone. In some examples, the communication mode selection manager 730 may be configured as or otherwise support a means for communicating, subsequent to communicating according to the first network energy saving mode, with the network entity according to the second network energy saving mode based on the UE being located in the second zone.

In some examples, the location manager 735 may be configured as or otherwise support a means for determining a location of the UE within the first zone or the second zone based on information provided from a positioning system of the UE. In some examples, a set of multiple zones are each configured with one network energy saving mode of two or more available network energy saving modes, and where two or more zones located in a same direction from the network entity have a same network energy saving mode.

In some examples, the beam configuration manager 740 may be configured as or otherwise support a means for determining the first network energy saving mode for communications with the network entity based on a beam configuration for communications with the network entity and the UE being located in the first zone. In some examples, to support receiving, the beam configuration manager 740 may be configured as or otherwise support a means for receiving a TCI state configuration that includes the first network energy saving mode indication for a first subset of TCI states associated with the first zone and the second network energy saving mode indication for a second subset of TCI states associated with the second zone. In some examples, to support receiving, the SSB manager 745 may be configured as or otherwise support a means for receiving a SSB that includes the first network energy saving mode indication for a first beam associated with the first zone and the second network energy saving mode indication for a second beam associated with the second zone.

In some examples, to support receiving, the reference signal manager 750 may be configured as or otherwise support a means for receiving a CSI reference signal (RS) configuration that includes a first CSI-RS resource associated with the first network energy saving mode and a second CSI-RS resource associated with the second network energy saving mode. In some examples, at least a first communication parameter of a set of communication parameters for communications between the UE and the network entity has a different value in the second network energy saving mode than in the first network energy saving mode. In some examples, the set of communication parameters includes one or more of an uplink transmit power, a modulation and coding scheme, a configured grant configuration, a semi-persistent scheduling configuration, or any combinations thereof.

In some examples, the communication mode selection manager 730 may be configured as or otherwise support a means for receiving a dynamic indication to switch from the first network energy saving mode to the second network energy saving mode. In some examples, the dynamic indication is received in a dedicated downlink control information communication that indicates to switch from the first network energy saving mode to the second network energy saving mode. In some examples, the dynamic indication is received in a downlink control information communication that schedules one or more uplink communications from the UE, or that triggers transmission of a channel state information report. In some examples, the first zone and the second zone are each associated with a network energy savings mode that is signaled in one or more of a master information block, a system information block, radio resource control signaling, layer one signaling, layer two signaling, layer three signaling, or any combinations thereof.

In some examples, the location manager 735 may be configured as or otherwise support a means for determining to use the first network energy saving mode based on the UE being located in the first zone and one or more of a service or priority associated with the communications between the UE and the network entity.

Figure 8:
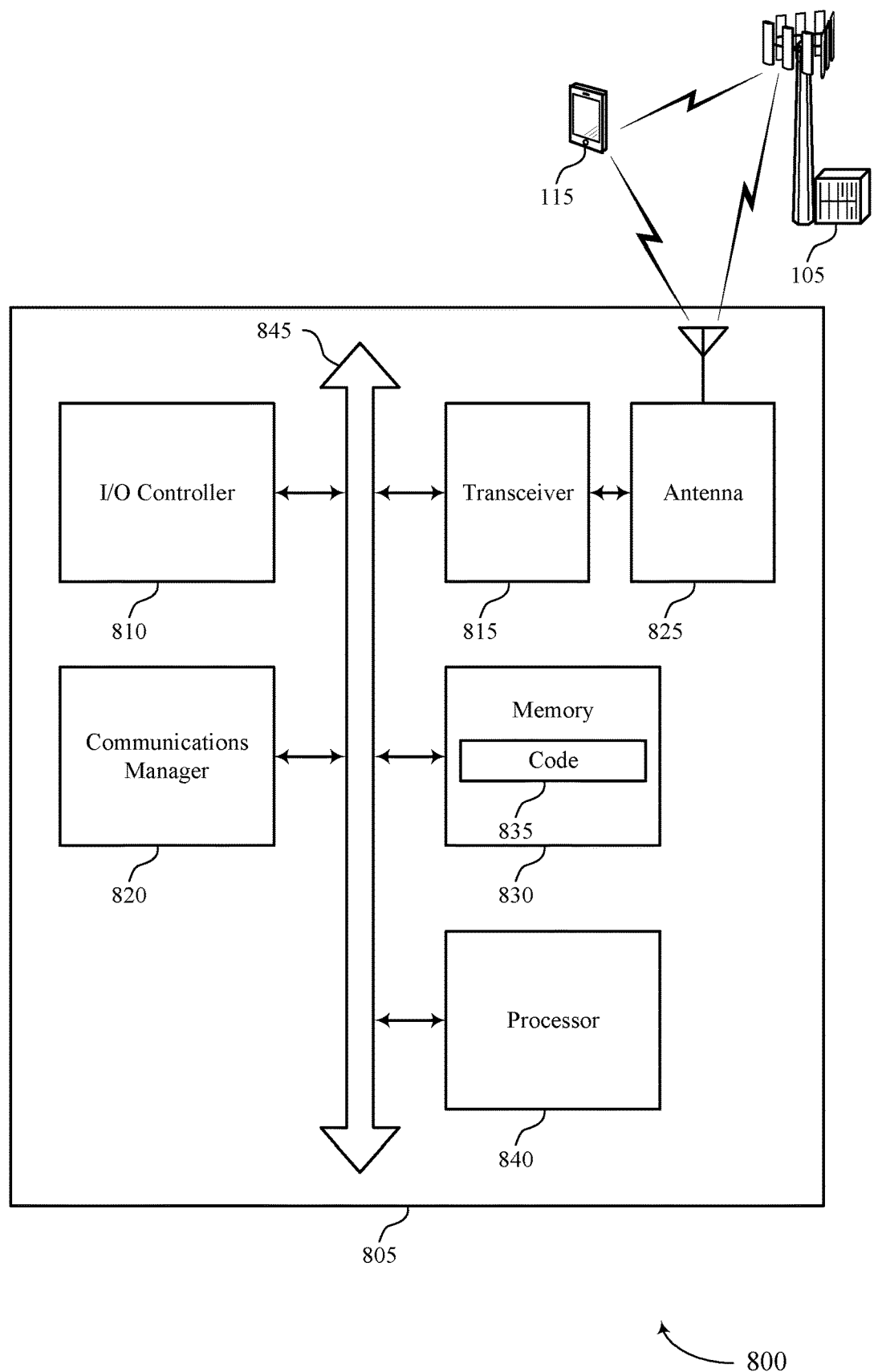
FIG. 8 illustrates a diagram of a system including a device that supports techniques for saving energy in wireless network communications in accordance with one or more aspects of the present disclosure.

FIG. 8 illustrates a diagram of a system 800 including a device 805 that supports techniques for saving energy in wireless network communications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for saving energy in wireless network communications). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving a first network energy saving mode indication for a first zone associated with a network entity and a second network energy saving mode indication for a second zone associated with the network entity, the first zone and the second zone each associated with one or more of a geographical area or direction relative to the network entity. The communications manager 820 may be configured as or otherwise support a means for communicating with the network entity according to the first network energy saving mode based on the UE being located in the first zone. The communications manager 820 may be configured as or otherwise support a means for communicating, subsequent to communicating according to the first network energy saving mode, with the network entity according to the second network energy saving mode based on the UE being located in the second zone.

By including or configuring the communications manager 820 in accordance with examples as described herein, the device 805 may support techniques for network energy savings that allow network entities to reduce operating power, while providing flexible and efficient techniques to indicate operation modes to served devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for saving energy in wireless network communications as described herein, or the processor 840 and the memory 830 may be otherwise configured to perform or support such operations.

Figure 9:
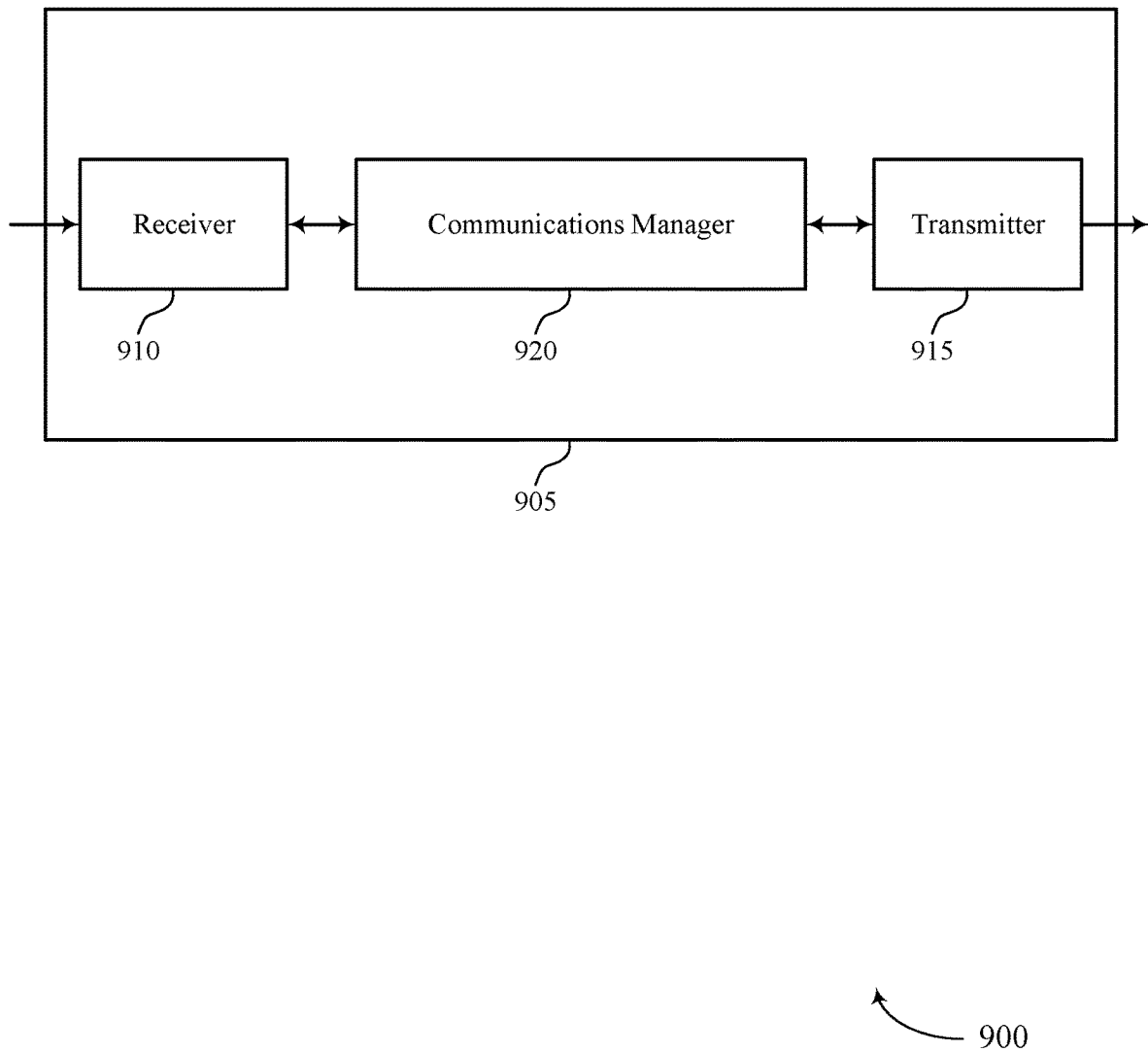
FIGS. 9 and 10 illustrate block diagrams of devices that support techniques for saving energy in wireless network communications in accordance with one or more aspects of the present disclosure.

FIG. 9 illustrates a block diagram 900 of a device 905 that supports techniques for saving energy in wireless network communications in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for saving energy in wireless network communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting, to at least a first UE, a first network energy saving mode indication for a first zone associated with the network entity and a second network energy saving mode indication for a second zone associated with the network entity, the first zone and the second zone each associated with one or more of a geographical area or direction relative to the network entity. The communications manager 920 may be configured as or otherwise support a means for communicating with the first UE according to the first network energy saving mode based on the first UE being located in the first zone. The communications manager 920 may be configured as or otherwise support a means for communicating with the first UE according to the second network energy saving mode responsive to a movement of the first UE to the second zone.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for network energy savings that allow network entities to reduce operating power, while providing flexible and efficient techniques to indicate operation modes to served devices.

Figure 10:
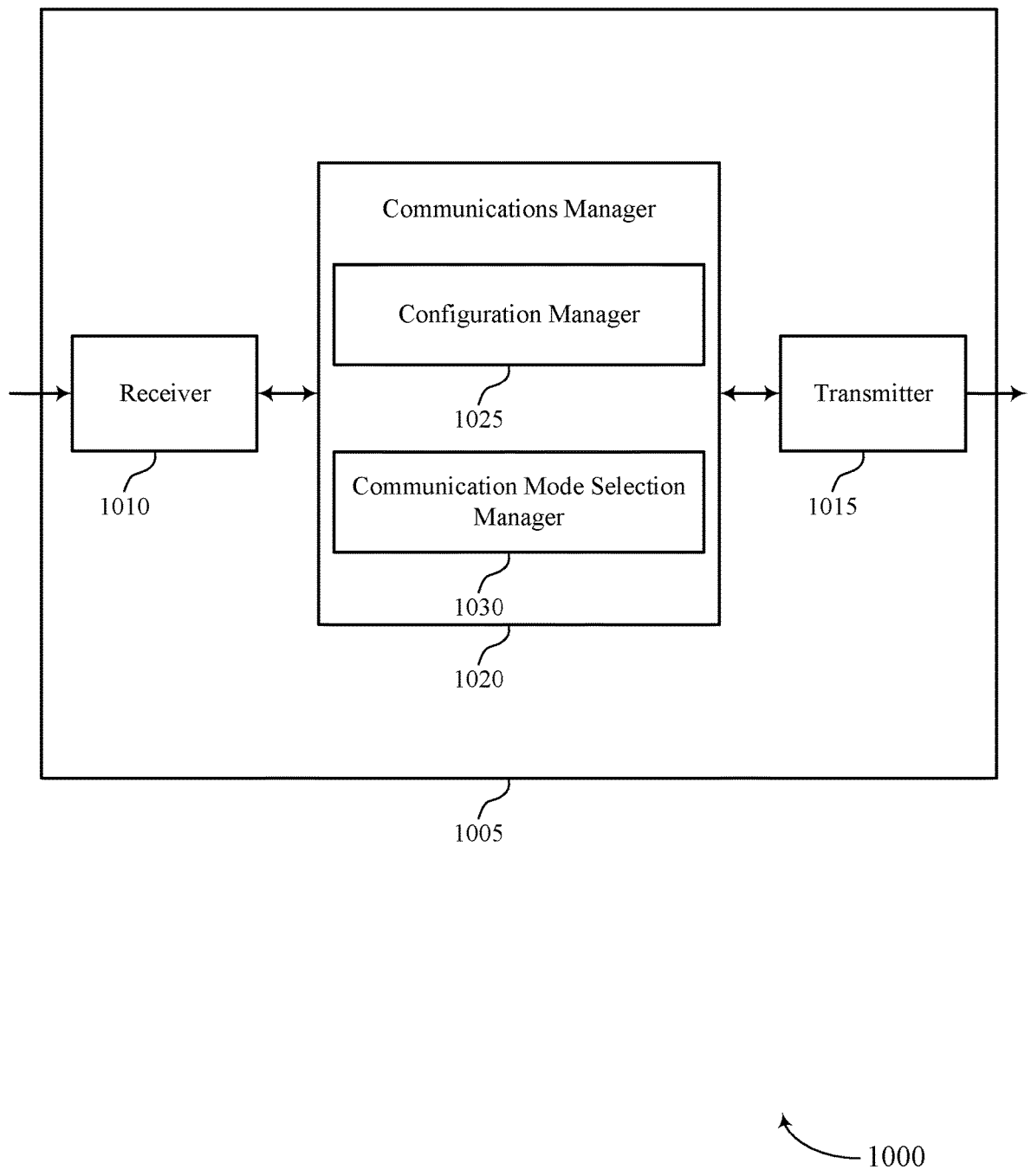

FIG. 10 illustrates a block diagram 1000 of a device 1005 that supports techniques for saving energy in wireless network communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for saving energy in wireless network communications as described herein. For example, the communications manager 1020 may include a configuration manager 1025 a communication mode selection manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The configuration manager 1025 may be configured as or otherwise support a means for transmitting, to at least a first UE, a first network energy saving mode indication for a first zone associated with the network entity and a second network energy saving mode indication for a second zone associated with the network entity, the first zone and the second zone each associated with one or more of a geographical area or direction relative to the network entity. The communication mode selection manager 1030 may be configured as or otherwise support a means for communicating with the first UE according to the first network energy saving mode based on the first UE being located in the first zone. The communication mode selection manager 1030 may be configured as or otherwise support a means for communicating with the first UE according to the second network energy saving mode responsive to a movement of the first UE to the second zone.

Figure 11:
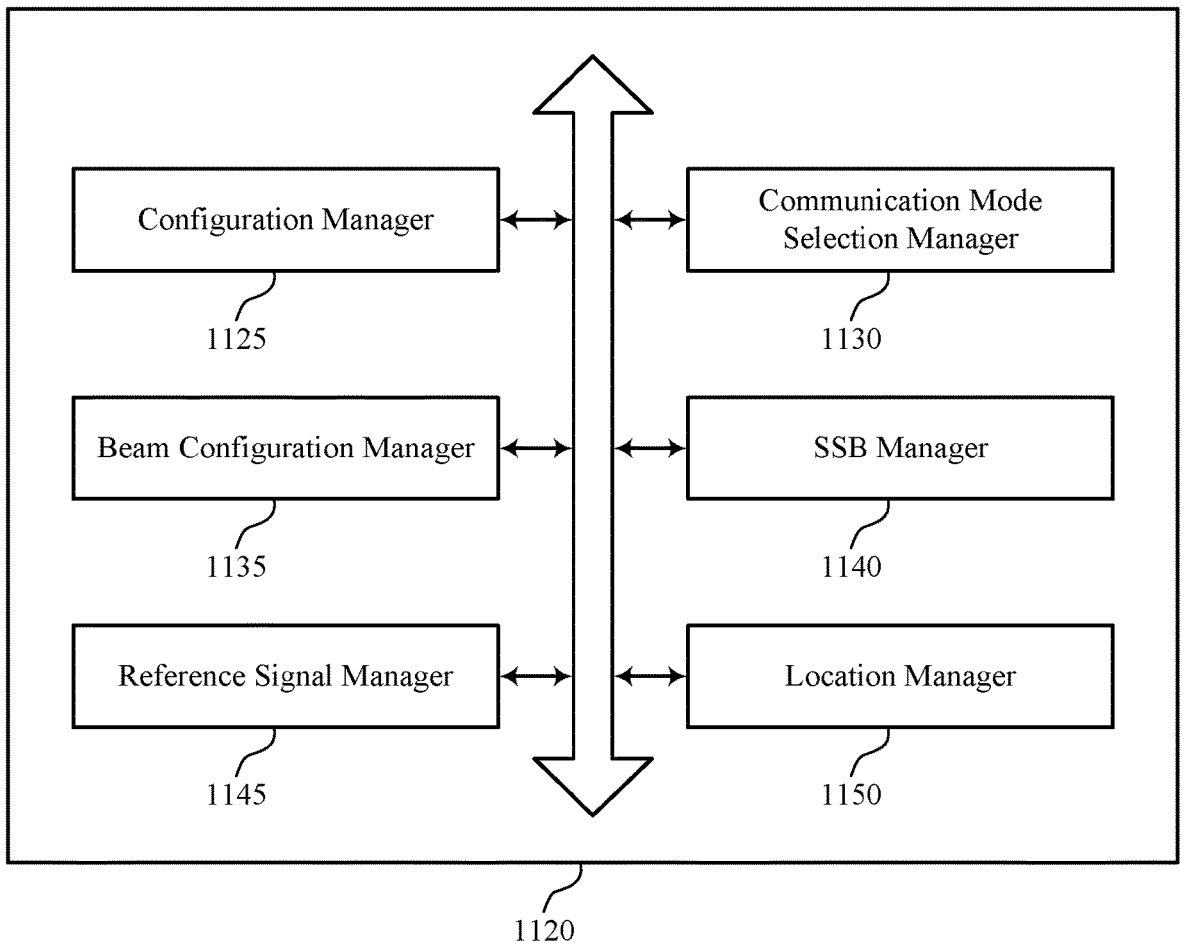
FIG. 11 illustrates a block diagram of a communications manager that supports techniques for saving energy in wireless network communications in accordance with one or more aspects of the present disclosure.

FIG. 11 illustrates a block diagram 1100 of a communications manager 1120 that supports techniques for saving energy in wireless network communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for saving energy in wireless network communications as described herein. For example, the communications manager 1120 may include a configuration manager 1125, a communication mode selection manager 1130, a beam configuration manager 1135, an SSB manager 1140, a reference signal manager 1145, a location manager 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The configuration manager 1125 may be configured as or otherwise support a means for transmitting, to at least a first UE, a first network energy saving mode indication for a first zone associated with the network entity and a second network energy saving mode indication for a second zone associated with the network entity, the first zone and the second zone each associated with one or more of a geographical area or direction relative to the network entity. The communication mode selection manager 1130 may be configured as or otherwise support a means for communicating with the first UE according to the first network energy saving mode based on the first UE being located in the first zone. In some examples, the communication mode selection manager 1130 may be configured as or otherwise support a means for communicating with the first UE according to the second network energy saving mode responsive to a movement of the first UE to the second zone.

In some examples, to support transmitting, the beam configuration manager 1135 may be configured as or otherwise support a means for transmitting configuration information for a set of TCI states, the configuration information includes the first network energy saving mode indication for a first subset of TCI states associated with the first zone and the second network energy saving mode indication for a second subset of TCI states associated with the second zone.

In some examples, to support transmitting, the SSB manager 1140 may be configured as or otherwise support a means for transmitting a SSB that includes the first network energy saving mode indication for a first beam associated with the first zone and the second network energy saving mode indication for a second beam associated with the second zone.

In some examples, to support transmitting, the reference signal manager 1145 may be configured as or otherwise support a means for transmitting a CSI reference signal (RS) configuration that includes a first CSI-RS resource associated with the first network energy saving mode and a second CSI-RS resource associated with the second network energy saving mode. In some examples, at least a first communication parameter of a set of communication parameters for communications between the first UE and the network entity has a different value in the second network energy saving mode than in the first network energy saving mode. In some examples, the set of communication parameters includes one or more of an uplink transmit power, a modulation and coding scheme, a configured grant configuration, a semi-persistent scheduling configuration, or any combinations thereof.

In some examples, the communication mode selection manager 1130 may be configured as or otherwise support a means for transmitting a dynamic indication to the first UE to switch from the first network energy saving mode to the second network energy saving mode. In some examples, the dynamic indication is provided in a dedicated downlink control information communication that indicates to switch from the first network energy saving mode to the second network energy saving mode. In some examples, the dynamic indication is provided in a downlink control information communication that schedules one or more uplink communications from the UE, or that triggers transmission of a channel state information report.

In some examples, the location manager 1150 may be configured as or otherwise support a means for configuring the first UE to use the first network energy saving mode based on the first UE being located in the first zone and one or more of a service or priority associated with the communications between the first UE and the network entity.

Figure 12:
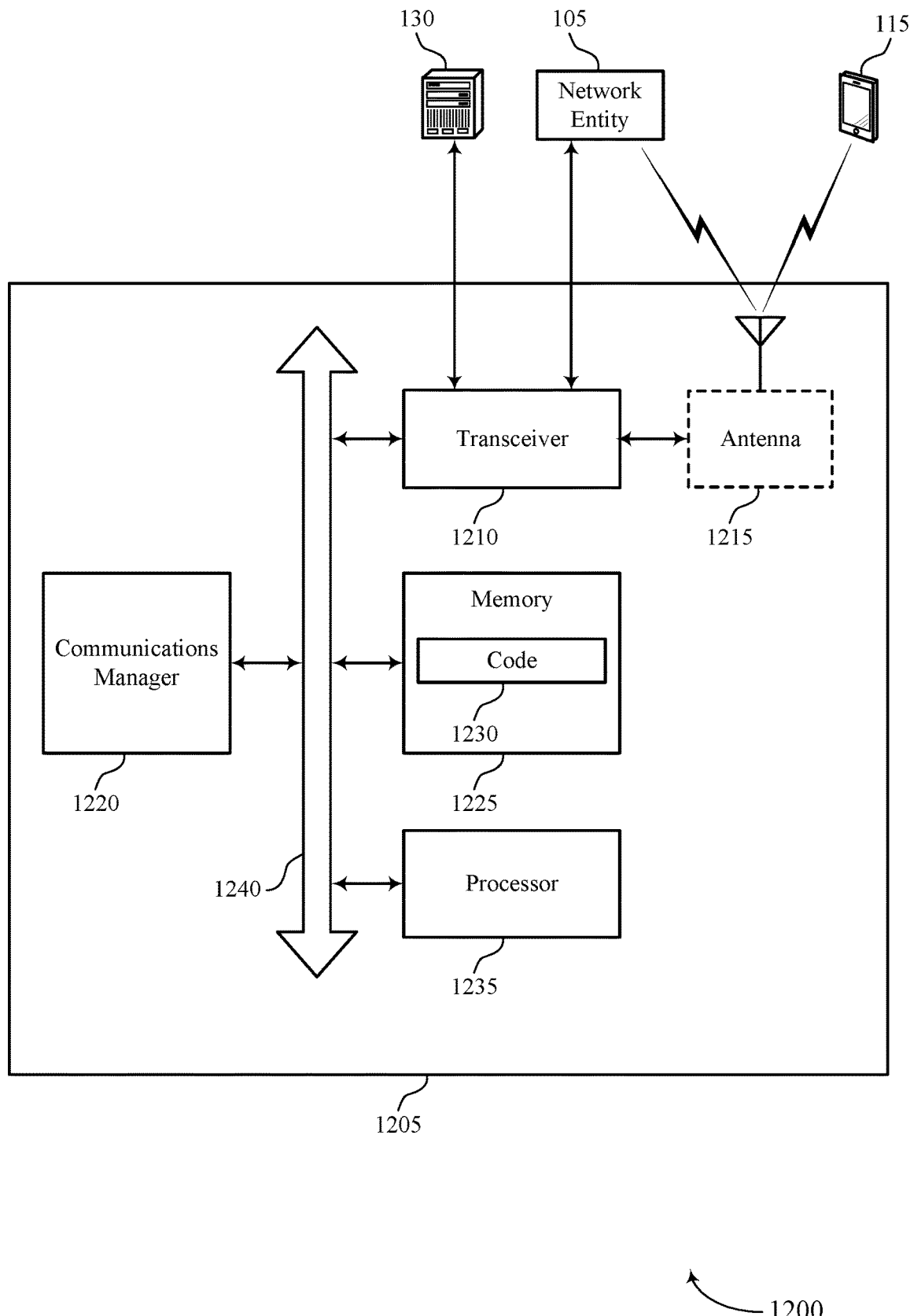
FIG. 12 illustrates a diagram of a system including a device that supports techniques for saving energy in wireless network communications in accordance with one or more aspects of the present disclosure.

FIG. 12 illustrates a diagram of a system 1200 including a device 1205 that supports techniques for saving energy in wireless network communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting techniques for saving energy in wireless network communications). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting, to at least a first UE, a first network energy saving mode indication for a first zone associated with the network entity and a second network energy saving mode indication for a second zone associated with the network entity, the first zone and the second zone each associated with one or more of a geographical area or direction relative to the network entity. The communications manager 1220 may be configured as or otherwise support a means for communicating with the first UE according to the first network energy saving mode based on the first UE being located in the first zone. The communications manager 1220 may be configured as or otherwise support a means for communicating with the first UE according to the second network energy saving mode responsive to a movement of the first UE to the second zone.

By including or configuring the communications manager 1220 in accordance with examples as described herein, the device 1205 may support techniques for network energy savings that allow network entities to reduce operating power, while providing flexible and efficient techniques to indicate operation modes to served devices.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of techniques for saving energy in wireless network communications as described herein, or the processor 1235 and the memory 1225 may be otherwise configured to perform or support such operations.

Figure 13:
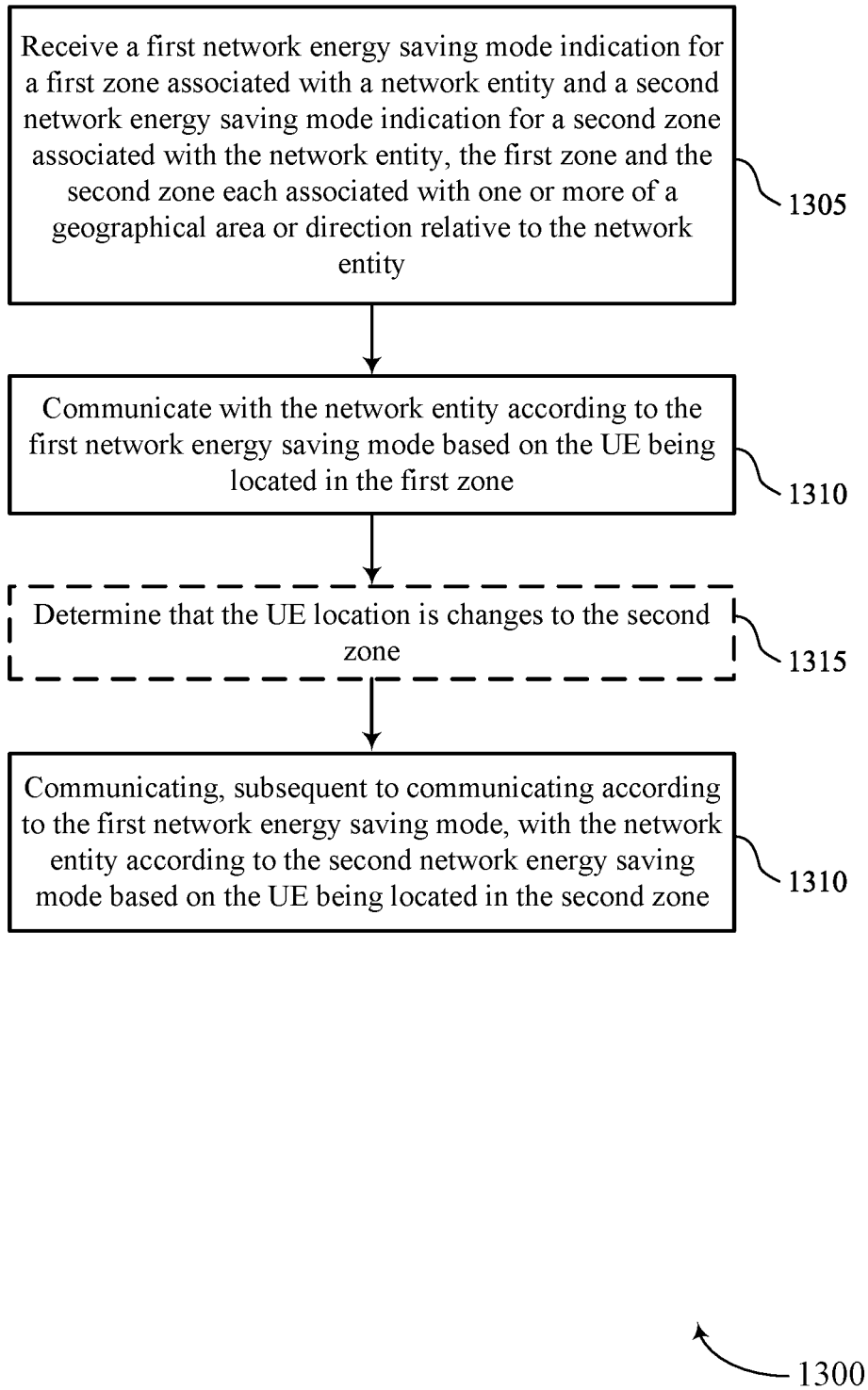
FIGS. 13 through 22 illustrate flowcharts showing methods that support techniques for saving energy in wireless network communications in accordance with one or more aspects of the present disclosure.

FIG. 13 illustrates a flowchart showing a method 1300 that supports techniques for saving energy in wireless network communications in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a first network energy saving mode indication for a first zone associated with a network entity and a second network energy saving mode indication for a second zone associated with the network entity, the first zone and the second zone each associated with one or more of a geographical area or direction relative to the network entity. The operations of 1305 may be performed in accordance with examples as disclosed herein. In some examples, aspects of the operations of 1305 may be performed by a configuration manager 725 as described with reference to FIG. 7.

At 1310, the method may include communicating with the network entity according to the first network energy saving mode based on the UE being located in the first zone. The operations of 1310 may be performed in accordance with examples as disclosed herein. In some examples, aspects of the operations of 1310 may be performed by a communication mode selection manager 730 as described with reference to FIG. 7.

Optionally, at 1315, the method may include determining that the UE location is changes to the second zone. The operations of 1315 may be performed in accordance with examples as disclosed herein. In some examples, aspects of the operations of 1315 may be performed by a location manager 735 as described with reference to FIG. 7.

At 1320, the method may include communicating, subsequent to communicating according to the first network energy saving mode, with the network entity according to the second network energy saving mode based on the UE being located in the second zone. The operations of 1320 may be performed in accordance with examples as disclosed herein. In some examples, aspects of the operations of 1320 may be performed by a communication mode selection manager 730 as described with reference to FIG. 7.

Figure 14:
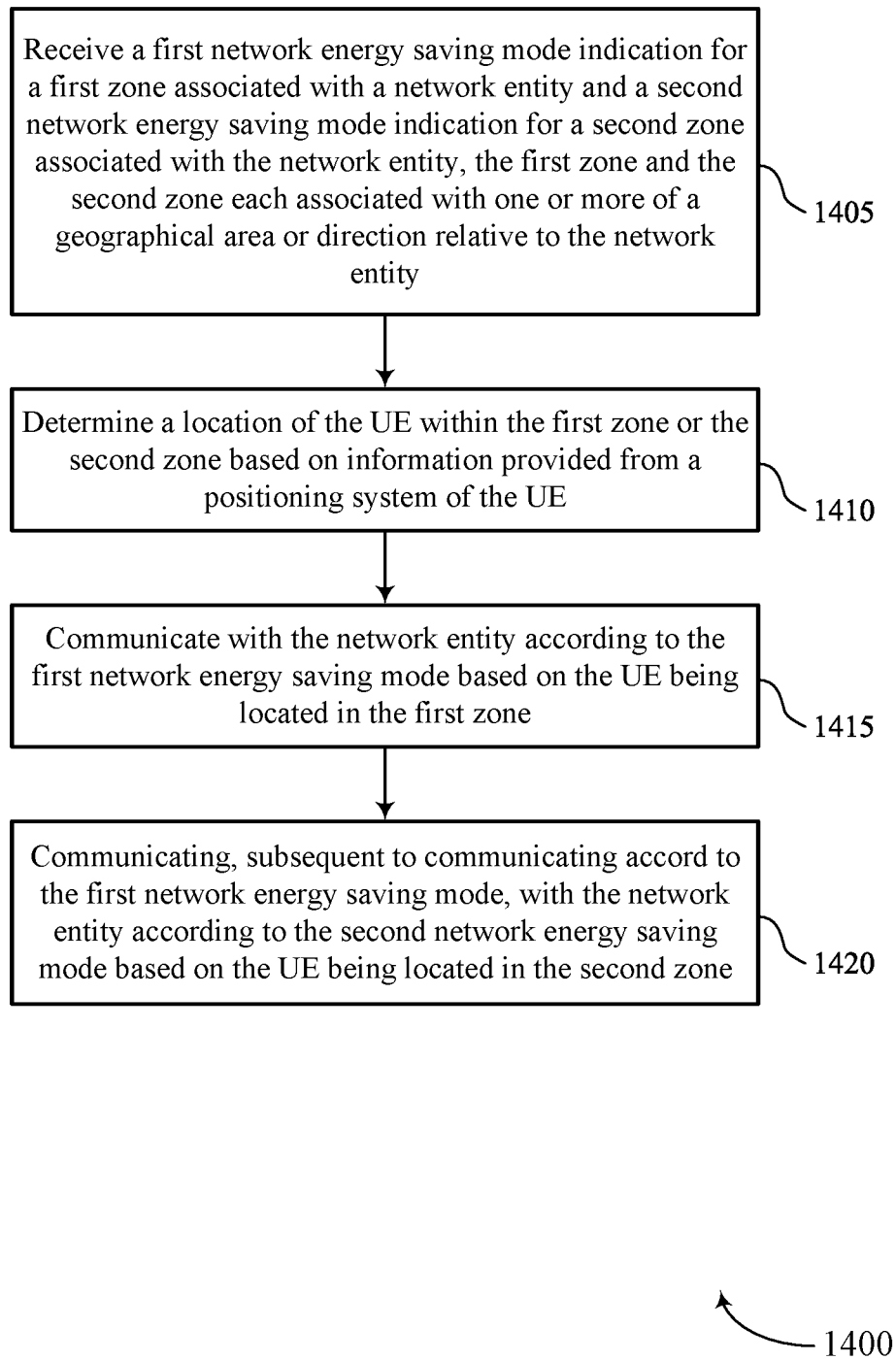

FIG. 14 illustrates a flowchart showing a method 1400 that supports techniques for saving energy in wireless network communications in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a first network energy saving mode indication for a first zone associated with a network entity and a second network energy saving mode indication for a second zone associated with the network entity, the first zone and the second zone each associated with one or more of a geographical area or direction relative to the network entity. The operations of 1405 may be performed in accordance with examples as disclosed herein. In some examples, aspects of the operations of 1405 may be performed by a configuration manager 725 as described with reference to FIG. 7.

At 1410, the method may include determining a location of the UE within the first zone or the second zone based on information provided from a positioning system of the UE. The operations of 1410 may be performed in accordance with examples as disclosed herein. In some examples, aspects of the operations of 1410 may be performed by a location manager 735 as described with reference to FIG. 7.

At 1415, the method may include communicating with the network entity according to the first network energy saving mode based on the UE being located in the first zone. The operations of 1415 may be performed in accordance with examples as disclosed herein. In some examples, aspects of the operations of 1415 may be performed by a communication mode selection manager 730 as described with reference to FIG. 7.

At 1420, the method may include communicating, subsequent to communicating according to the first network energy saving mode, with the network entity according to the second network energy saving mode based on the UE being located in the second zone. The operations of 1420 may be performed in accordance with examples as disclosed herein. In some examples, aspects of the operations of 1420 may be performed by a communication mode selection manager 730 as described with reference to FIG. 7.

Figure 15:
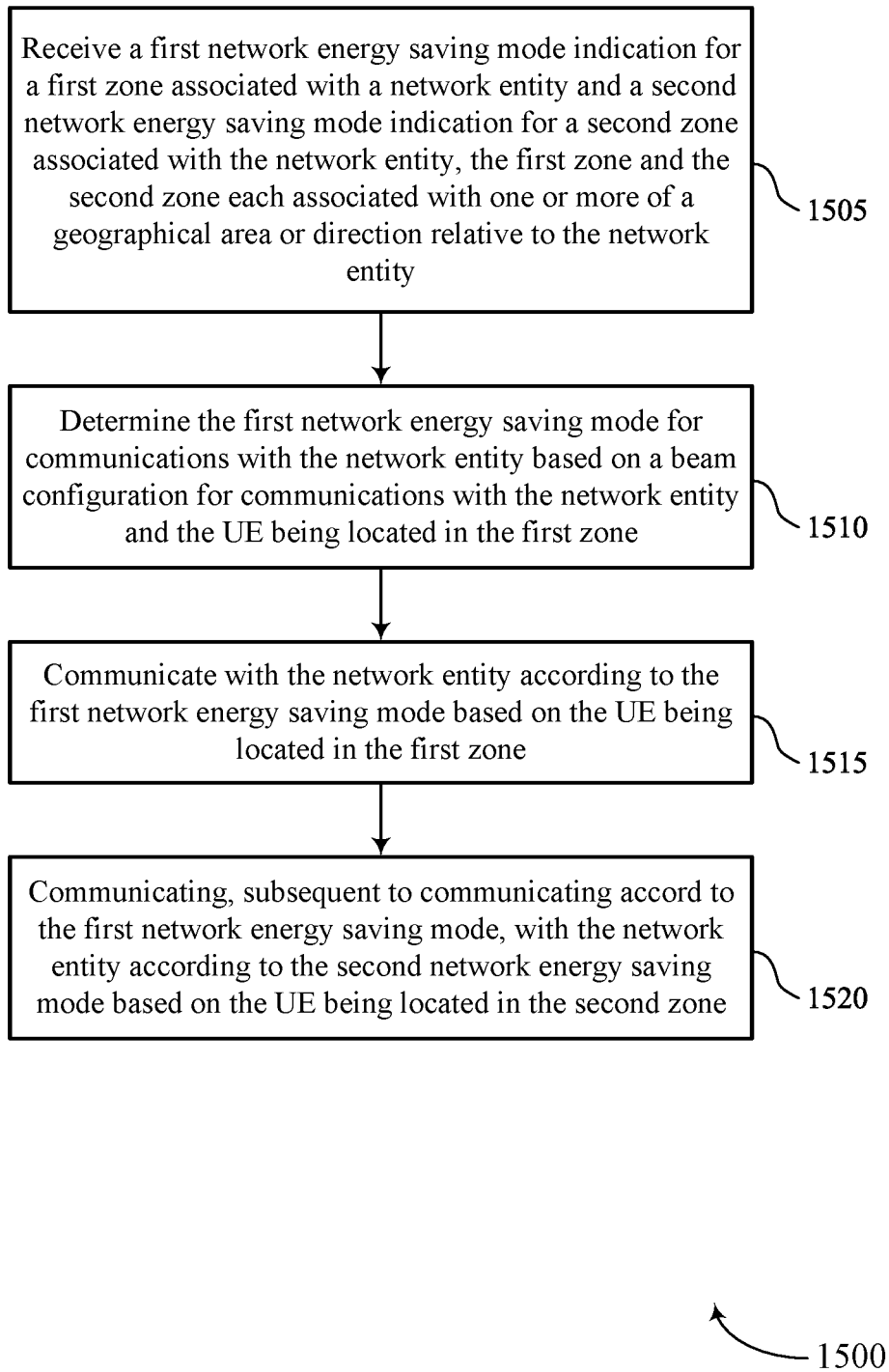

FIG. 15 illustrates a flowchart showing a method 1500 that supports techniques for saving energy in wireless network communications in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving a first network energy saving mode indication for a first zone associated with a network entity and a second network energy saving mode indication for a second zone associated with the network entity, the first zone and the second zone each associated with one or more of a geographical area or direction relative to the network entity. The operations of 1505 may be performed in accordance with examples as disclosed herein. In some examples, aspects of the operations of 1505 may be performed by a configuration manager 725 as described with reference to FIG. 7.

At 1510, the method may include determining the first network energy saving mode for communications with the network entity based on a beam configuration for communications with the network entity and the UE being located in the first zone. The operations of 1510 may be performed in accordance with examples as disclosed herein. In some examples, aspects of the operations of 1510 may be performed by a beam configuration manager 740 as described with reference to FIG. 7.

At 1515, the method may include communicating with the network entity according to the first network energy saving mode based on the UE being located in the first zone. The operations of 1515 may be performed in accordance with examples as disclosed herein. In some examples, aspects of the operations of 1515 may be performed by a communication mode selection manager 730 as described with reference to FIG. 7.

At 1520, the method may include communicating, subsequent to communicating according to the first network energy saving mode, with the network entity according to the second network energy saving mode based on the UE being located in the second zone. The operations of 1520 may be performed in accordance with examples as disclosed herein. In some examples, aspects of the operations of 1520 may be performed by a communication mode selection manager 730 as described with reference to FIG. 7.

Figure 16:
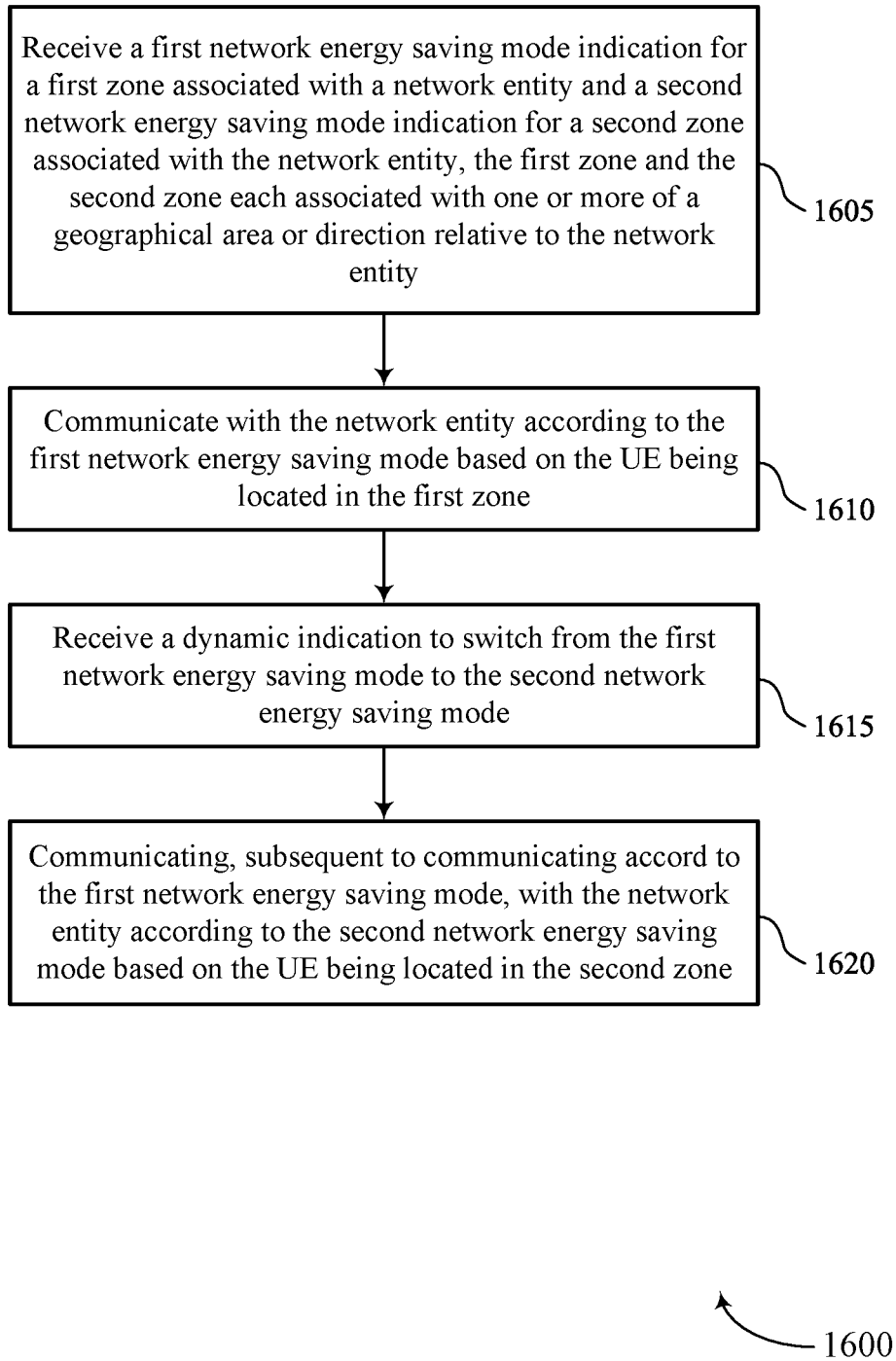

FIG. 16 illustrates a flowchart showing a method 1600 that supports techniques for saving energy in wireless network communications in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include receiving a first network energy saving mode indication for a first zone associated with a network entity and a second network energy saving mode indication for a second zone associated with the network entity, the first zone and the second zone each associated with one or more of a geographical area or direction relative to the network entity. The operations of 1605 may be performed in accordance with examples as disclosed herein. In some examples, aspects of the operations of 1605 may be performed by a configuration manager 725 as described with reference to FIG. 7.

At 1610, the method may include communicating with the network entity according to the first network energy saving mode based on the UE being located in the first zone. The operations of 1610 may be performed in accordance with examples as disclosed herein. In some examples, aspects of the operations of 1610 may be performed by a communication mode selection manager 730 as described with reference to FIG. 7.

At 1615, the method may include receiving a dynamic indication to switch from the first network energy saving mode to the second network energy saving mode. The operations of 1615 may be performed in accordance with examples as disclosed herein. In some examples, aspects of the operations of 1615 may be performed by a communication mode selection manager 730 as described with reference to FIG. 7.

At 1620, the method may include communicating, subsequent to communicating according to the first network energy saving mode, with the network entity according to the second network energy saving mode based on the UE being located in the second zone. The operations of 1620 may be performed in accordance with examples as disclosed herein. In some examples, aspects of the operations of 1620 may be performed by a communication mode selection manager 730 as described with reference to FIG. 7.

Figure 17:
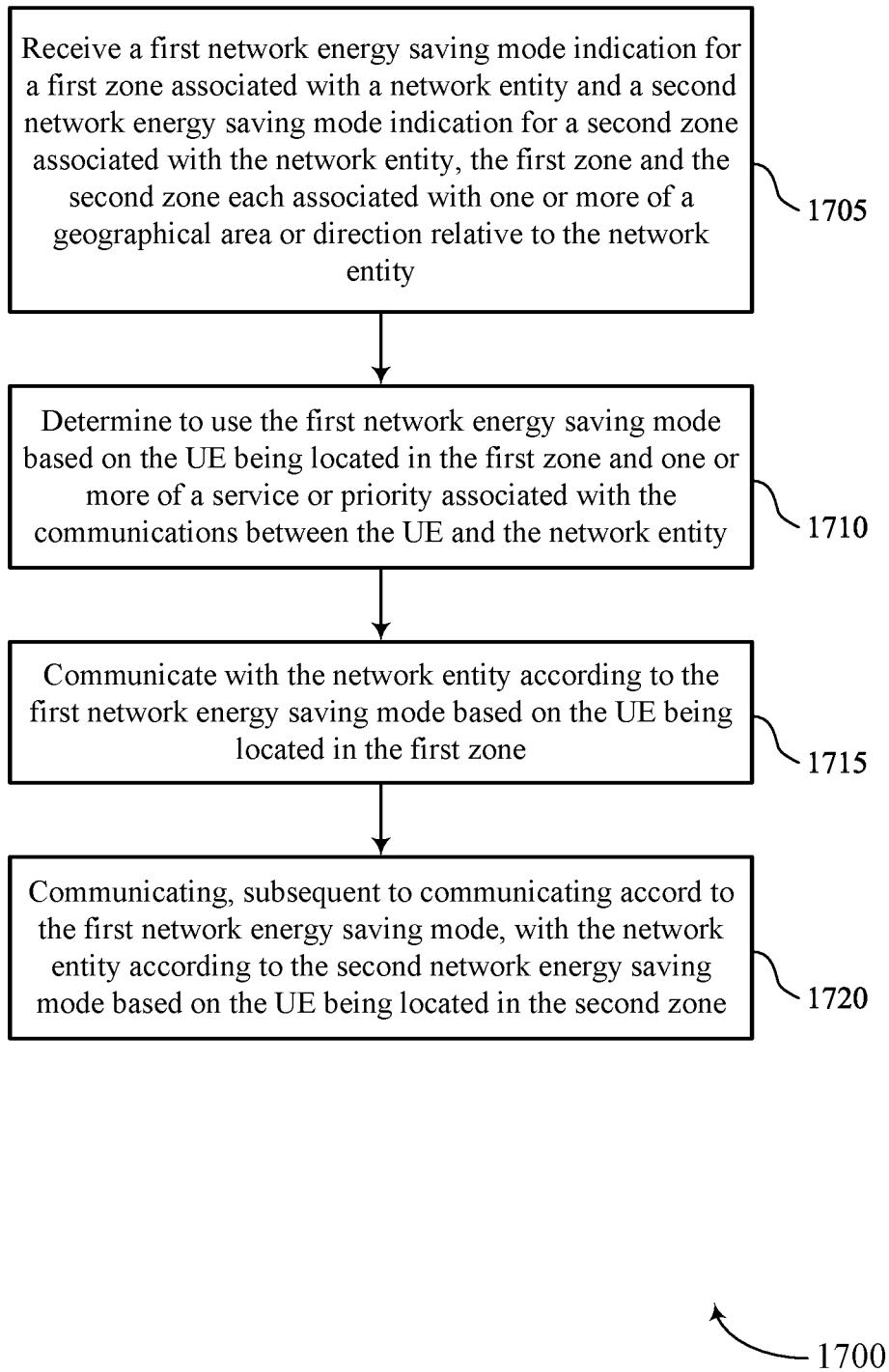

FIG. 17 illustrates a flowchart showing a method 1700 that supports techniques for saving energy in wireless network communications in accordance with one or more aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1705, the method may include receiving a first network energy saving mode indication for a first zone associated with a network entity and a second network energy saving mode indication for a second zone associated with the network entity, the first zone and the second zone each associated with one or more of a geographical area or direction relative to the network entity. The operations of 1705 may be performed in accordance with examples as disclosed herein. In some examples, aspects of the operations of 1705 may be performed by a configuration manager 725 as described with reference to FIG. 7.

At 1710, the method may include determining to use the first network energy saving mode based on the UE being located in the first zone and one or more of a service or priority associated with the communications between the UE and the network entity. The operations of 1710 may be performed in accordance with examples as disclosed herein. In some examples, aspects of the operations of 1710 may be performed by a location manager 735 as described with reference to FIG. 7.

At 1715, the method may include communicating with the network entity according to the first network energy saving mode based on the UE being located in the first zone. The operations of 1715 may be performed in accordance with examples as disclosed herein. In some examples, aspects of the operations of 1715 may be performed by a communication mode selection manager 730 as described with reference to FIG. 7.

At 1720, the method may include communicating, subsequent to communicating according to the first network energy saving mode, with the network entity according to the second network energy saving mode based on the UE being located in the second zone. The operations of 1720 may be performed in accordance with examples as disclosed herein. In some examples, aspects of the operations of 1720 may be performed by a communication mode selection manager 730 as described with reference to FIG. 7.

Figure 18:
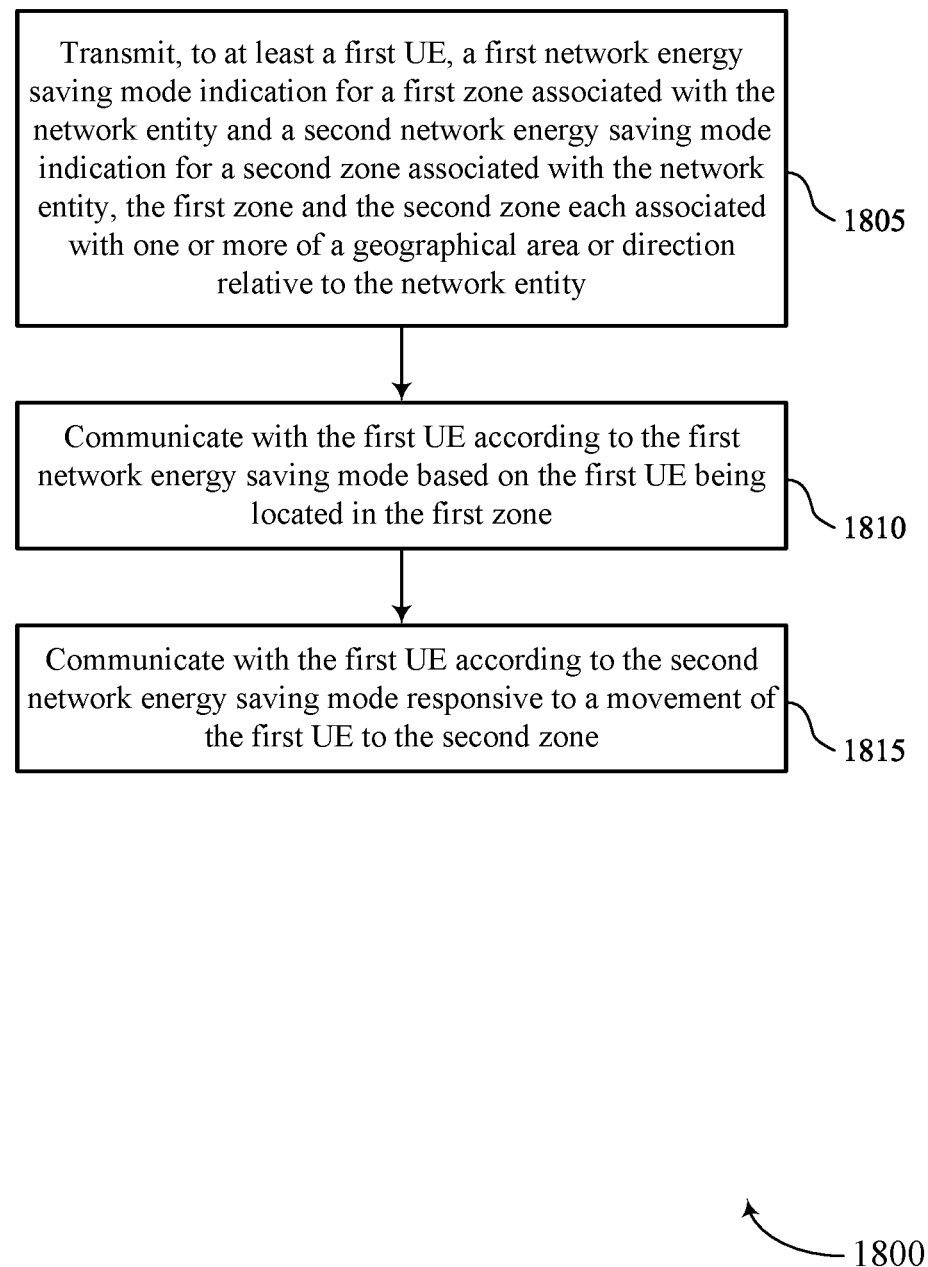

FIG. 18 illustrates a flowchart showing a method 1800 that supports techniques for saving energy in wireless network communications in accordance with one or more aspects of the present disclosure. The operations of the method 1800 may be implemented by a UE or a network entity or its components as described herein. For example, the operations of the method 1800 may be performed by a UE 115 as described with reference to FIGS. 1 through 8 or a network entity as described with reference to FIGS. 1 through 4 and 9 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1805, the method may include transmitting, to at least a first UE, a first network energy saving mode indication for a first zone associated with the network entity and a second network energy saving mode indication for a second zone associated with the network entity, the first zone and the second zone each associated with one or more of a geographical area or direction relative to the network entity. The operations of 1805 may be performed in accordance with examples as disclosed herein. In some examples, aspects of the operations of 1805 may be performed by a configuration manager 725 or a configuration manager 1125 as described with reference to FIGS. 7 and 11.

At 1810, the method may include communicating with the first UE according to the first network energy saving mode based on the first UE being located in the first zone. The operations of 1810 may be performed in accordance with examples as disclosed herein. In some examples, aspects of the operations of 1810 may be performed by a communication mode selection manager 730 or a communication mode selection manager 1130 as described with reference to FIGS. 7 and 11.

At 1815, the method may include communicating with the first UE according to the second network energy saving mode responsive to a movement of the first UE to the second zone. The operations of 1815 may be performed in accordance with examples as disclosed herein. In some examples, aspects of the operations of 1815 may be performed by a communication mode selection manager 730 or a communication mode selection manager 1130 as described with reference to FIGS. 7 and 11.

Figure 19:
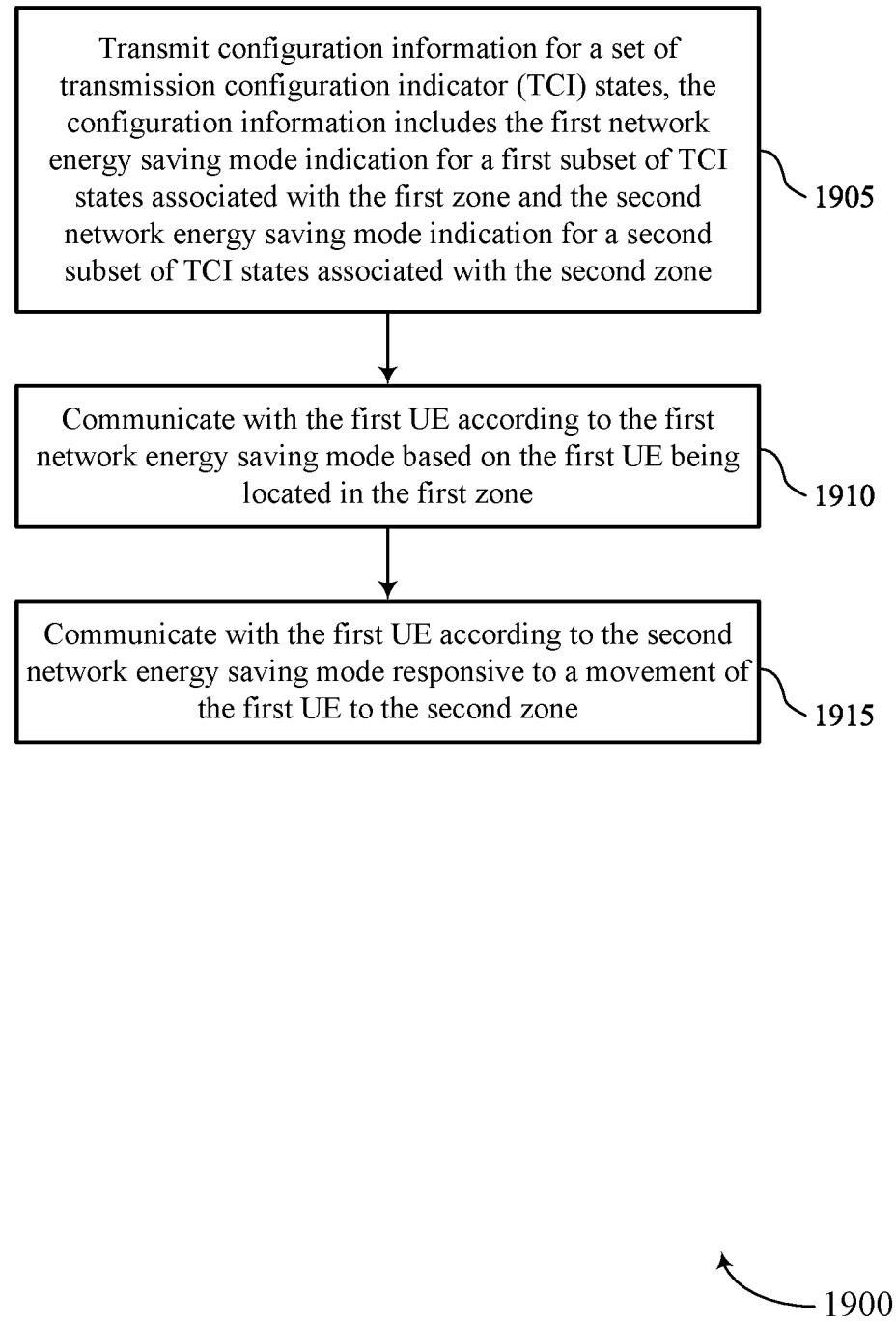

FIG. 19 illustrates a flowchart showing a method 1900 that supports techniques for saving energy in wireless network communications in accordance with one or more aspects of the present disclosure. The operations of the method 1900 may be implemented by a UE or a network entity or its components as described herein. For example, the operations of the method 1900 may be performed by a UE 115 as described with reference to FIGS. 1 through 8 or a network entity as described with reference to FIGS. 1 through 4 and 9 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1905, the method may include transmitting configuration information for a set of TCI states, the configuration information includes the first network energy saving mode indication for a first subset of TCI states associated with the first zone and the second network energy saving mode indication for a second subset of TCI states associated with the second zone. The operations of 1905 may be performed in accordance with examples as disclosed herein. In some examples, aspects of the operations of 1905 may be performed by a beam configuration manager 740 or a beam configuration manager 1135 as described with reference to FIGS. 7 and 11.

At 1910, the method may include communicating with the first UE according to the first network energy saving mode based on the first UE being located in the first zone. The operations of 1910 may be performed in accordance with examples as disclosed herein. In some examples, aspects of the operations of 1910 may be performed by a communication mode selection manager 730 or a communication mode selection manager 1130 as described with reference to FIGS. 7 and 11.

At 1915, the method may include communicating with the first UE according to the second network energy saving mode responsive to a movement of the first UE to the second zone. The operations of 1915 may be performed in accordance with examples as disclosed herein. In some examples, aspects of the operations of 1915 may be performed by a communication mode selection manager 730 or a communication mode selection manager 1130 as described with reference to FIGS. 7 and 11.

Figure 20:
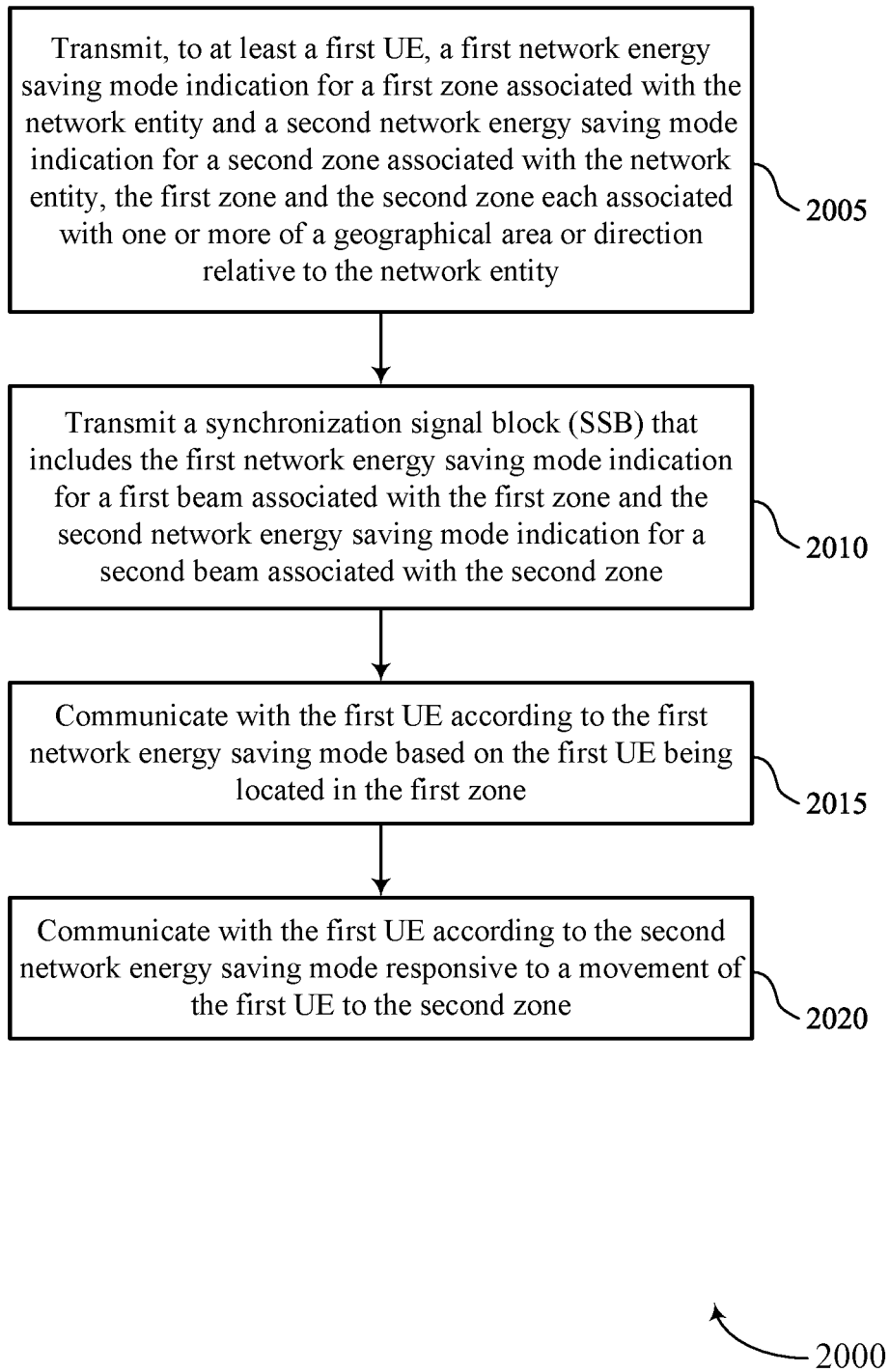

FIG. 20 illustrates a flowchart showing a method 2000 that supports techniques for saving energy in wireless network communications in accordance with one or more aspects of the present disclosure. The operations of the method 2000 may be implemented by a UE or a network entity or its components as described herein. For example, the operations of the method 2000 may be performed by a UE 115 as described with reference to FIGS. 1 through 8 or a network entity as described with reference to FIGS. 1 through 4 and 9 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 2005, the method may include transmitting, to at least a first UE, a first network energy saving mode indication for a first zone associated with the network entity and a second network energy saving mode indication for a second zone associated with the network entity, the first zone and the second zone each associated with one or more of a geographical area or direction relative to the network entity. The operations of 2005 may be performed in accordance with examples as disclosed herein. In some examples, aspects of the operations of 2005 may be performed by a configuration manager 725 or a configuration manager 1125 as described with reference to FIGS. 7 and 11.

At 2010, the method may include transmitting a SSB that includes the first network energy saving mode indication for a first beam associated with the first zone and the second network energy saving mode indication for a second beam associated with the second zone. The operations of 2010 may be performed in accordance with examples as disclosed herein. In some examples, aspects of the operations of 2010 may be performed by an SSB manager 745 or an SSB manager 1140 as described with reference to FIGS. 7 and 11.

At 2015, the method may include communicating with the first UE according to the first network energy saving mode based on the first UE being located in the first zone. The operations of 2015 may be performed in accordance with examples as disclosed herein. In some examples, aspects of the operations of 2015 may be performed by a communication mode selection manager 730 or a communication mode selection manager 1130 as described with reference to FIGS. 7 and 11.

At 2020, the method may include communicating with the first UE according to the second network energy saving mode responsive to a movement of the first UE to the second zone. The operations of 2020 may be performed in accordance with examples as disclosed herein. In some examples, aspects of the operations of 2020 may be performed by a communication mode selection manager 730 or a communication mode selection manager 1130 as described with reference to FIGS. 7 and 11.

Figure 21:
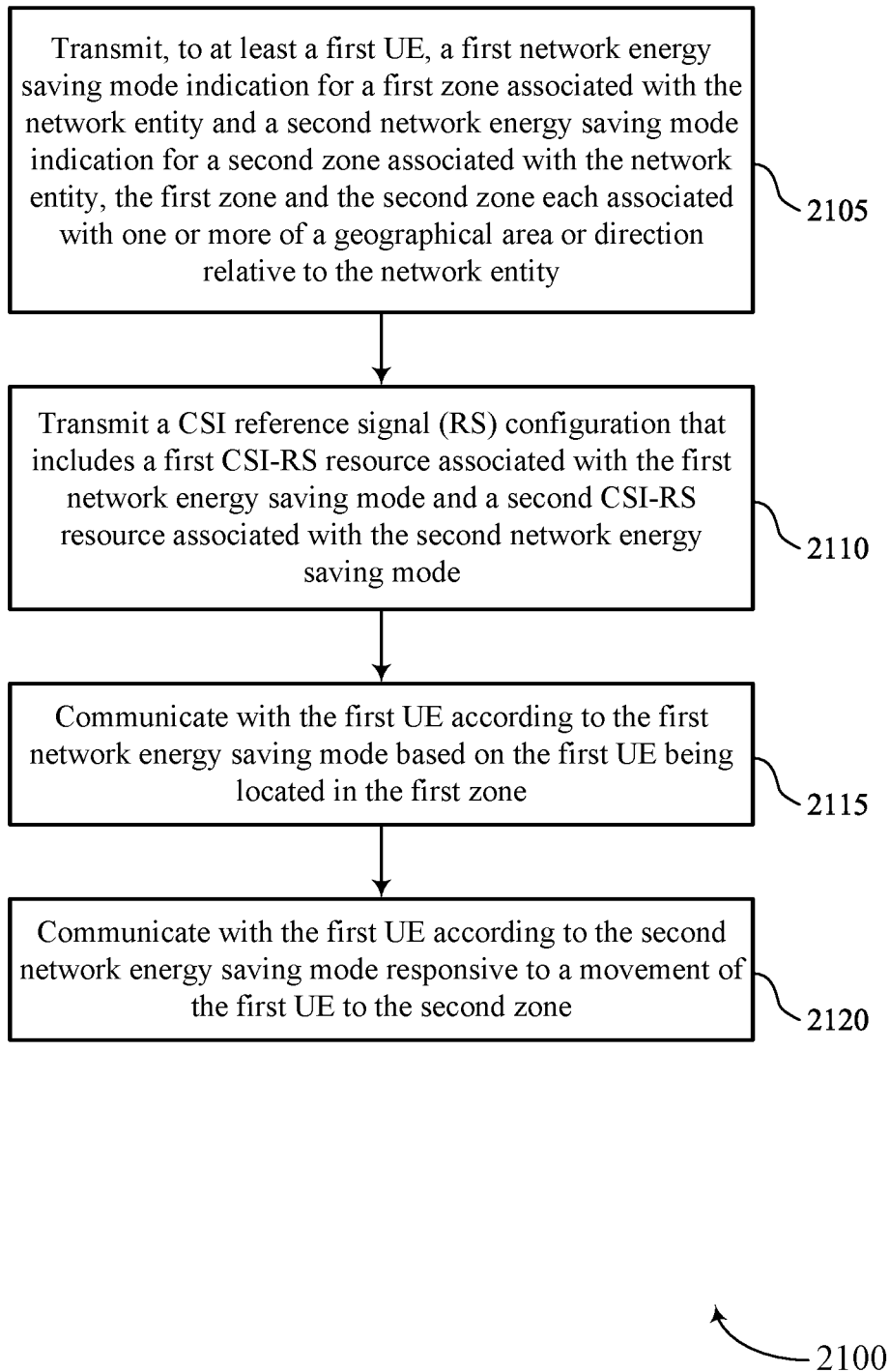

FIG. 21 illustrates a flowchart showing a method 2100 that supports techniques for saving energy in wireless network communications in accordance with one or more aspects of the present disclosure. The operations of the method 2100 may be implemented by a UE or a network entity or its components as described herein. For example, the operations of the method 2100 may be performed by a UE 115 as described with reference to FIGS. 1 through 8 or a network entity as described with reference to FIGS. 1 through 4 and 9 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 2105, the method may include transmitting, to at least a first UE, a first network energy saving mode indication for a first zone associated with the network entity and a second network energy saving mode indication for a second zone associated with the network entity, the first zone and the second zone each associated with one or more of a geographical area or direction relative to the network entity. The operations of 2105 may be performed in accordance with examples as disclosed herein. In some examples, aspects of the operations of 2105 may be performed by a configuration manager 725 or a configuration manager 1125 as described with reference to FIGS. 7 and 11.

At 2110, the method may include transmitting a CSI-RS configuration that includes a first CSI-RS resource associated with the first network energy saving mode and a second CSI-RS resource associated with the second network energy saving mode. The operations of 2110 may be performed in accordance with examples as disclosed herein. In some examples, aspects of the operations of 2110 may be performed by a reference signal manager 750 or a reference signal manager 1145 as described with reference to FIGS. 7 and 11.

At 2115, the method may include communicating with the first UE according to the first network energy saving mode based on the first UE being located in the first zone. The operations of 2115 may be performed in accordance with examples as disclosed herein. In some examples, aspects of the operations of 2115 may be performed by a communication mode selection manager 730 or a communication mode selection manager 1130 as described with reference to FIGS. 7 and 11.

At 2120, the method may include communicating with the first UE according to the second network energy saving mode responsive to a movement of the first UE to the second zone. The operations of 2120 may be performed in accordance with examples as disclosed herein. In some examples, aspects of the operations of 2120 may be performed by a communication mode selection manager 730 or a communication mode selection manager 1130 as described with reference to FIGS. 7 and 11.

Figure 22:
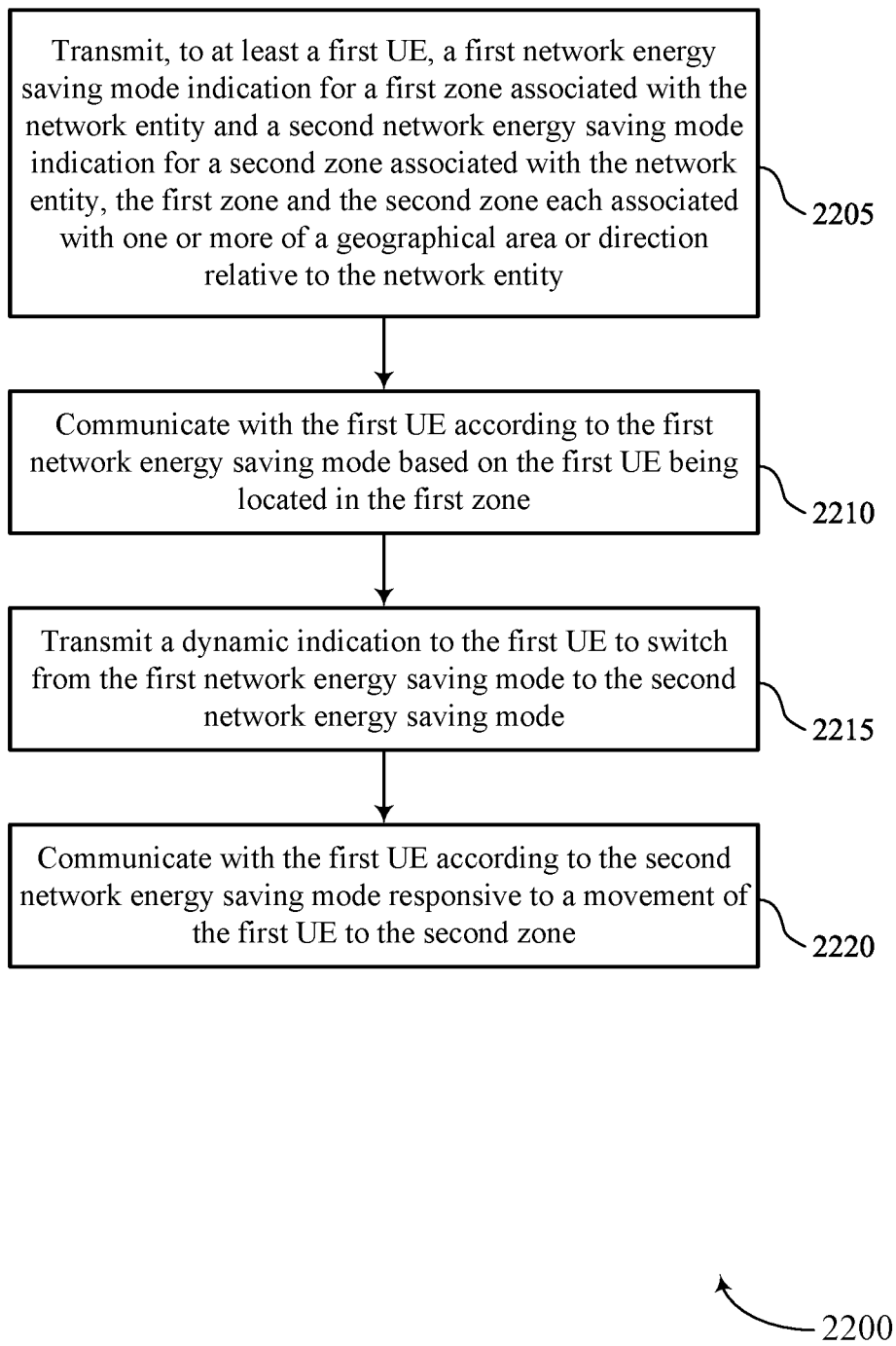

FIG. 22 illustrates a flowchart showing a method 2200 that supports techniques for saving energy in wireless network communications in accordance with one or more aspects of the present disclosure. The operations of the method 2200 may be implemented by a UE or a network entity or its components as described herein. For example, the operations of the method 2200 may be performed by a UE 115 as described with reference to FIGS. 1 through 8 or a network entity as described with reference to FIGS. 1 through 4 and 9 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 2205, the method may include transmitting, to at least a first UE, a first network energy saving mode indication for a first zone associated with the network entity and a second network energy saving mode indication for a second zone associated with the network entity, the first zone and the second zone each associated with one or more of a geographical area or direction relative to the network entity. The operations of 2205 may be performed in accordance with examples as disclosed herein. In some examples, aspects of the operations of 2205 may be performed by a configuration manager 725 or a configuration manager 1125 as described with reference to FIGS. 7 and 11.

At 2210, the method may include communicating with the first UE according to the first network energy saving mode based on the first UE being located in the first zone. The operations of 2210 may be performed in accordance with examples as disclosed herein. In some examples, aspects of the operations of 2210 may be performed by a communication mode selection manager 730 or a communication mode selection manager 1130 as described with reference to FIGS. 7 and 11.

At 2215, the method may include transmitting a dynamic indication to the first UE to switch from the first network energy saving mode to the second network energy saving mode. The operations of 2215 may be performed in accordance with examples as disclosed herein. In some examples, aspects of the operations of 2215 may be performed by a communication mode selection manager 730 or a communication mode selection manager 1130 as described with reference to FIGS. 7 and 11.

At 2220, the method may include communicating with the first UE according to the second network energy saving mode responsive to a movement of the first UE to the second zone. The operations of 2220 may be performed in accordance with examples as disclosed herein. In some examples, aspects of the operations of 2220 may be performed by a communication mode selection manager 730 or a communication mode selection manager 1130 as described with reference to FIGS. 7 and 11.

The following provides an overview of aspects of the present disclosure:

Aspect 1: A method for wireless communication at a UE, comprising: receiving a first network energy saving mode indication for a first zone associated with a network entity and a second network energy saving mode indication for a second zone associated with the network entity, the first zone and the second zone each associated with one or more of a geographical area or direction relative to the network entity; communicating with the network entity according to the first network energy saving mode based at least in part on the UE being located in the first zone; and communicating, subsequent to communicating according to the first network energy saving mode, with the network entity according to the second network energy saving mode based at least in part on the UE being located in the second zone.

Aspect 2: The method of aspect 1, further comprising: determining a location of the UE within the first zone or the second zone based at least in part on information provided from a positioning system of the UE.

Aspect 3: The method of any of aspects 1 through 2, wherein a plurality of zones are each configured with one network energy saving mode of two or more available network energy saving modes, and wherein two or more zones located in a same direction from the network entity have a same network energy saving mode.

Aspect 4: The method of any of aspects 1 through 3, further comprising: determining the first network energy saving mode for communications with the network entity based at least in part on a beam configuration for communications with the network entity and the UE being located in the first zone.

Aspect 5: The method of any of aspects 1 through 4, wherein the receiving comprises: receiving a transmission configuration indicator (TCI) state configuration that includes the first network energy saving mode indication for a first subset of TCI states associated with the first zone and the second network energy saving mode indication for a second subset of TCI states associated with the second zone.

Aspect 6: The method of any of aspects 1 through 5, wherein the receiving comprises: receiving a synchronization signal block (SSB) that includes the first network energy saving mode indication for a first beam associated with the first zone and the second network energy saving mode indication for a second beam associated with the second zone.

Aspect 7: The method of any of aspects 1 through 6, wherein the receiving comprises: receiving a CSI reference signal (RS) configuration that includes a first CSI-RS resource associated with the first network energy saving mode and a second CSI-RS resource associated with the second network energy saving mode.

Aspect 8: The method of any of aspects 1 through 7, wherein at least a first communication parameter of a set of communication parameters for communications between the UE and the network entity has a different value in the second network energy saving mode than in the first network energy saving mode.

Aspect 9: The method of aspect 8, wherein the set of communication parameters includes one or more of an uplink transmit power, a modulation and coding scheme, a configured grant configuration, a semi-persistent scheduling configuration, or any combinations thereof.

Aspect 10: The method of any of aspects 1 through 9, further comprising: receiving a dynamic indication to switch from the first network energy saving mode to the second network energy saving mode.

Aspect 11: The method of aspect 10, wherein the dynamic indication is received in a dedicated downlink control information communication that indicates to switch from the first network energy saving mode to the second network energy saving mode.

Aspect 12: The method of any of aspects 10 through 11, wherein the dynamic indication is received in a downlink control information communication that schedules one or more uplink communications from the UE, or that triggers transmission of a channel state information report.

Aspect 13: The method of any of aspects 1 through 12, wherein the first zone and the second zone are each associated with a network energy savings mode that is signaled in one or more of a master information block, a system information block, radio resource control signaling, layer one signaling, layer two signaling, layer three signaling, or any combinations thereof.

Aspect 14: The method of any of aspects 1 through 13, further comprising: determining to use the first network energy saving mode based at least in part on the UE being located in the first zone and one or more of a service or priority associated with the communications between the UE and the network entity.

Aspect 15: A method for wireless communication at a network entity, comprising: transmitting, to at least a first UE, a first network energy saving mode indication for a first zone associated with the network entity and a second network energy saving mode indication for a second zone associated with the network entity, the first zone and the second zone each associated with one or more of a geographical area or direction relative to the network entity; communicating with the first UE according to the first network energy saving mode based at least in part on the first UE being located in the first zone; and communicating with the first UE according to the second network energy saving mode responsive to a movement of the first UE to the second zone.

Aspect 16: The method of aspect 15, wherein the transmitting comprises: transmitting configuration information for a set of transmission configuration indicator (TCI) states, the configuration information includes the first network energy saving mode indication for a first subset of TCI states associated with the first zone and the second network energy saving mode indication for a second subset of TCI states associated with the second zone.

Aspect 17: The method of any of aspects 15 through 16, wherein the transmitting comprises: transmitting a synchronization signal block (SSB) that includes the first network energy saving mode indication for a first beam associated with the first zone and the second network energy saving mode indication for a second beam associated with the second zone.

Aspect 18: The method of any of aspects 15 through 17, wherein the transmitting comprises: transmitting a CSI reference signal (RS) configuration that includes a first CSI-RS resource associated with the first network energy saving mode and a second CSI-RS resource associated with the second network energy saving mode.

Aspect 19: The method of any of aspects 15 through 18, wherein at least a first communication parameter of a set of communication parameters for communications between the first UE and the network entity has a different value in the second network energy saving mode than in the first network energy saving mode.

Aspect 20: The method of aspect 19, wherein the set of communication parameters includes one or more of an uplink transmit power, a modulation and coding scheme, a configured grant configuration, a semi-persistent scheduling configuration, or any combinations thereof.

Aspect 21: The method of any of aspects 15 through 20, further comprising: transmitting a dynamic indication to the first UE to switch from the first network energy saving mode to the second network energy saving mode.

Aspect 22: The method of aspect 21, wherein the dynamic indication is provided in a dedicated downlink control information communication that indicates to switch from the first network energy saving mode to the second network energy saving mode.

Aspect 23: The method of any of aspects 21 through 22, wherein the dynamic indication is provided in a downlink control information communication that schedules one or more uplink communications from the UE, or that triggers transmission of a channel state information report.

Aspect 24: The method of any of aspects 15 through 23, further comprising: configuring the first UE to use the first network energy saving mode based at least in part on the first UE being located in the first zone and one or more of a service or priority associated with the communications between the first UE and the network entity.

Aspect 25: An apparatus for wireless communication at a UE, comprising a processor; memory coupled with the processor; and instructions stored in the memory and executable by the processor to cause the apparatus to perform a method of any of aspects 1 through 14.

Aspect 26: An apparatus for wireless communication at a UE, comprising at least one means for performing a method of any of aspects 1 through 14.

Aspect 27: A non-transitory computer-readable medium storing code for wireless communication at a UE, the code comprising instructions executable by a processor to perform a method of any of aspects 1 through 14.

Aspect 28: An apparatus for wireless communication at a network entity, comprising a processor; memory coupled with the processor; and instructions stored in the memory and executable by the processor to cause the apparatus to perform a method of any of aspects 15 through 24.

Aspect 29: An apparatus for wireless communication at a network entity, comprising at least one means for performing a method of any of aspects 15 through 24.

Aspect 30: A non-transitory computer-readable medium storing code for wireless communication at a network entity, the code comprising instructions executable by a processor to perform a method of any of aspects 15 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving a first network energy saving mode indication for a first zone associated with a network entity and a second network energy saving mode indication for a second zone associated with the network entity, the first zone and the second zone each associated with one or more of a geographical area or direction relative to the network entity, and the first network energy saving mode and the second network energy saving mode indicate different network operation modes at the network entity;

communicating with the network entity according to the first network energy saving mode based at least in part on the UE being located in the first zone; and communicating, subsequent to communicating according to the first network energy saving mode, with the network entity according to the second network energy saving mode based at least in part on the UE being located in the second zone.

2. The method of claim 1, further comprising:
determining a location of the UE within the first zone or the second zone based at least in part on information provided from a positioning system of the UE.

3. The method of claim 1, wherein a plurality of zones are each configured with one network energy saving mode of two or more available network energy saving modes, and wherein two or more zones located in a same direction from the network entity have a same network energy saving mode.

4. The method of claim 1, further comprising:
determining the first network energy saving mode for communications with the network entity based at least in part on a beam configuration for communications with the network entity and the UE being located in the first zone.

5. The method of claim 1, wherein the receiving comprises:
receiving a transmission configuration indicator (TCI) state configuration that includes the first network energy saving mode indication for a first subset of TCI states associated with the first zone and the second network energy saving mode indication for a second subset of TCI states associated with the second zone.

6. The method of claim 1, wherein the receiving comprises:
receiving a synchronization signal block (SSB) that includes the first network energy saving mode indication for a first beam associated with the first zone and the second network energy saving mode indication for a second beam associated with the second zone.

7. The method of claim 1, wherein the receiving comprises:
receiving a channel state information (CSI) reference signal (RS) configuration that includes a first CSI-RS resource associated with the first network energy saving mode and a second CSI-RS resource associated with the second network energy saving mode.

8. The method of claim 1, wherein at least a first communication parameter of a set of communication parameters for communications between the UE and the network entity has a different value in the second network energy saving mode than in the first network energy saving mode.

9. The method of claim 8, wherein the set of communication parameters includes one or more of an uplink transmit power, a modulation and coding scheme, a configured grant configuration, a semi-persistent scheduling configuration, or any combinations thereof.

10. The method of claim 1, further comprising:
receiving a dynamic indication to switch from the first network energy saving mode to the second network energy saving mode.

11. The method of claim 10, wherein the dynamic indication is received in a dedicated downlink control information communication that indicates to switch from the first network energy saving mode to the second network energy saving mode.

12. The method of claim 10, wherein the dynamic indication is received in a downlink control information communication that schedules one or more uplink communications from the UE, or that triggers transmission of a channel state information report.

13. The method of claim 1, wherein the first zone and the second zone are each associated with a network energy savings mode that is signaled in one or more of a master information block, a system information block, radio resource control signaling, layer one signaling, layer two signaling, layer three signaling, or any combinations thereof.

14. The method of claim 1, further comprising:
determining to use the first network energy saving mode based at least in part on the UE being located in the first zone and one or more of a service or priority associated with the communications between the UE and the network entity.

15. A method for wireless communication at a network entity, comprising:
transmitting, to at least a first user equipment (UE), a first network energy saving mode indication for a first zone associated with the network entity and a second network energy saving mode indication for a second zone associated with the network entity, the first zone and the second zone each associated with one or more of a geographical area or direction relative to the network entity, and the first network energy saving mode and the second network energy saving mode indicate different network operation modes at the network entity;
communicating with the first UE according to the first network energy saving mode based at least in part on the first UE being located in the first zone; and
communicating with the first UE according to the second network energy saving mode responsive to a movement of the first UE to the second zone.

16. The method of claim 15, wherein the transmitting comprises:
transmitting configuration information for a set of transmission configuration indicator (TCI) states, the configuration information includes the first network energy saving mode indication for a first subset of TCI states associated with the first zone and the second network energy saving mode indication for a second subset of TCI states associated with the second zone.

17. The method of claim 15, wherein the transmitting comprises:
transmitting a synchronization signal block (SSB) that includes the first network energy saving mode indication for a first beam associated with the first zone and the second network energy saving mode indication for a second beam associated with the second zone.

18. The method of claim 15, wherein the transmitting comprises:
transmitting a channel state information (CSI) reference signal (RS) configuration that includes a first CSI-RS resource associated with the first network energy saving mode and a second CSI-RS resource associated with the second network energy saving mode.

19. The method of claim 15, wherein at least a first communication parameter of a set of communication parameters for communications between the first UE and the network entity has a different value in the second network energy saving mode than in the first network energy saving mode.

20. The method of claim 19, wherein the set of communication parameters includes one or more of an uplink transmit power, a modulation and coding scheme, a configured grant configuration, a semi-persistent scheduling configuration, or any combinations thereof.

21. The method of claim 15, further comprising:
transmitting a dynamic indication to the first UE to switch from the first network energy saving mode to the second network energy saving mode.

22. The method of claim 21, wherein the dynamic indication is provided in a dedicated downlink control information communication that indicates to switch from the first network energy saving mode to the second network energy saving mode.

23. The method of claim 21, wherein the dynamic indication is provided in a downlink control information communication that schedules one or more uplink communications from the UE, or that triggers transmission of a channel state information report.

24. The method of claim 15, further comprising:
configuring the first UE to use the first network energy saving mode based at least in part on the first UE being located in the first zone and one or more of a service or priority associated with the communications between the first UE and the network entity.

25. An apparatus for wireless communication at a user equipment (UE), comprising:
a processor;
memory coupled with the processor; and
instructions stored in the memory and executable by the processor to cause the apparatus to:
receive a first network energy saving mode indication for a first zone associated with a network entity and a second network energy saving mode indication for a second zone associated with the network entity, the first zone and the second zone each associated with one or more of a geographical area or direction relative to the network entity, and the first network energy saving mode and the second network energy saving mode indicate different network operation modes at the network entity;
communicate with the network entity according to the first network energy saving mode based at least in part on the UE being located in the first zone; and
communicating, subsequent to communicating accord to the first network energy saving mode, with the network entity according to the second network energy saving mode based at least in part on the UE being located in the second zone.

26. The apparatus of claim 25, wherein a plurality of zones are each configured with one network energy saving mode of two or more available network energy saving modes, and wherein two or more zones located in a same direction from the network entity have a same network energy saving mode.

27. The apparatus of claim 25, wherein the instructions are further executable by the processor to cause the apparatus to:

determine the first network energy saving mode for communications with the network entity based at least in part on a beam configuration for communications with the network entity and the UE being located in the first zone.

28. An apparatus for wireless communication at a network entity, comprising:
a processor;
memory coupled with the processor; and
instructions stored in the memory and executable by the processor to cause the apparatus to:
transmit, to at least a first user equipment (UE), a first network energy saving mode indication for a first zone associated with the network entity and a second network energy saving mode indication for a second zone associated with the network entity, the first zone and the second zone each associated with one or more of a geographical area or direction relative to the network entity, and the first network energy saving mode and the second network energy saving mode indicate different network operation modes at the network entity;
communicate with the first UE according to the first network energy saving mode based at least in part on the first UE being located in the first zone; and
communicate with the first UE according to the second network energy saving mode responsive to a movement of the first UE to the second zone.

29. The apparatus of claim 28, wherein the instructions to transmit are executable by the processor to cause the apparatus to:
transmit configuration information for a set of transmission configuration indicator (TCI) states, the configuration information includes the first network energy saving mode indication for a first subset of TCI states associated with the first zone and the second network energy saving mode indication for a second subset of TCI states associated with the second zone.

30. The apparatus of claim 28, wherein the instructions to transmit are executable by the processor to cause the apparatus to:
transmit a synchronization signal block (SSB) that includes the first network energy saving mode indication for a first beam associated with the first zone and the second network energy saving mode indication for a second beam associated with the second zone.

* * * * *